United States Patent [19]
Rockwell

[11] 3,829,171
[45] Aug. 13, 1974

[54] SKID CONTROL SYSTEM COMPONENTS

[76] Inventor: Edward A. Rockwell, 167 Ashdale Pl., Los Angeles, Calif. 90049

[22] Filed: Aug. 3, 1971

[21] Appl. No.: 168,683

[52] U.S. Cl.............................. 303/24 C, 303/6 C
[51] Int. Cl............................................. B60t 8/18
[58] Field of Search.......... 303/6 C, 10, 24 A, 24 C, 303/24 F, 24 R

[56] References Cited
UNITED STATES PATENTS
3,184,269   5/1965   Hager......................... 303/24 R X
3,476,443  11/1969   Bratten et al. .................. 303/24 C Primary Examiner—Duane A. Reger
Attorney, Agent, or Firm—Wolfe, Hubbard, Leydig, Voit & Osann, Ltd.

[57] ABSTRACT

Deceleration controlled skid control automotive braking system components including a controller, a power booster and a variable proportioning device are disclosed. The controller utilizes the force produced upon accelerating (or decelerating) a mass suspended in low friction bearings within a housing, to actuate a three-way valve having high and low supply pressures imposed across it. The three-way valve is constructed to provide a control fluid pressure which varies as a function of vehicle deceleration, and is adapted to serve as the supply pressure for power actuated devices, such as the power booster and the variable proportioning device. The controller includes a device modifying the action of the three-way valve upon sudden reduction in vehicle deceleration, to change the control fluid pressure and modify the action of the power booster upon such sudden reduction in deceleration indicating impending wheel lock-up, for skid control. The power booster and variable proportioning device are constructed to utilize the varying control pressure produced by the deceleration actuated three-way valve as the air supply pressure.

11 Claims, 21 Drawing Figures

INVENTOR.
EDWARD A. ROCKWELL

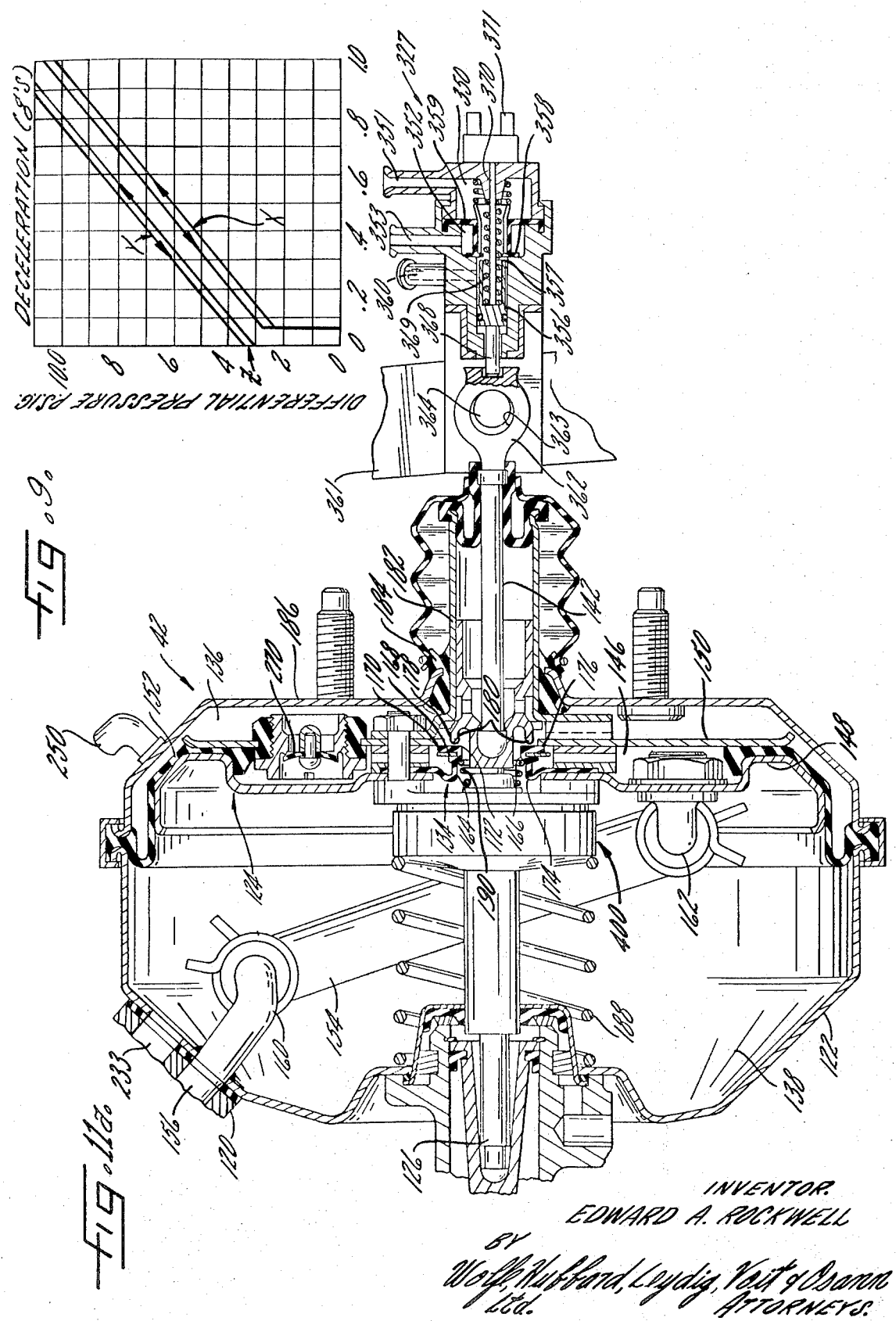

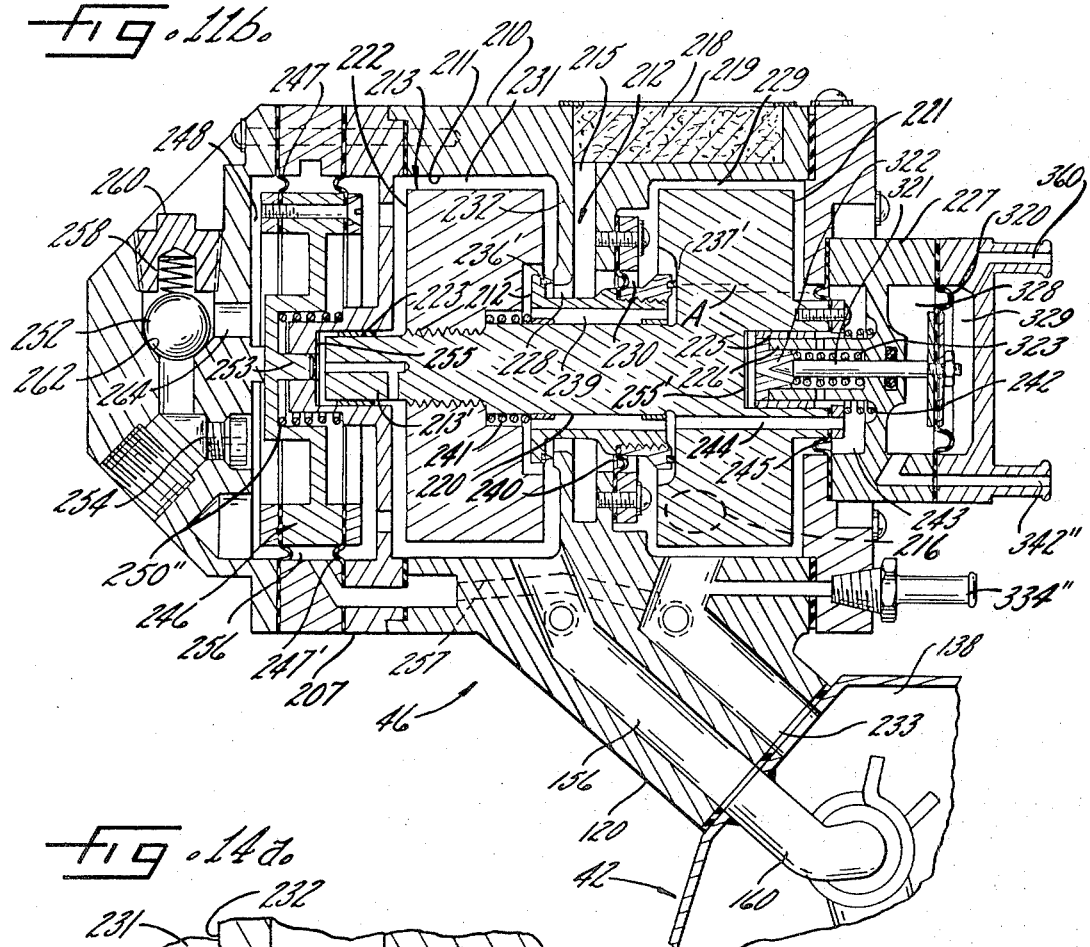
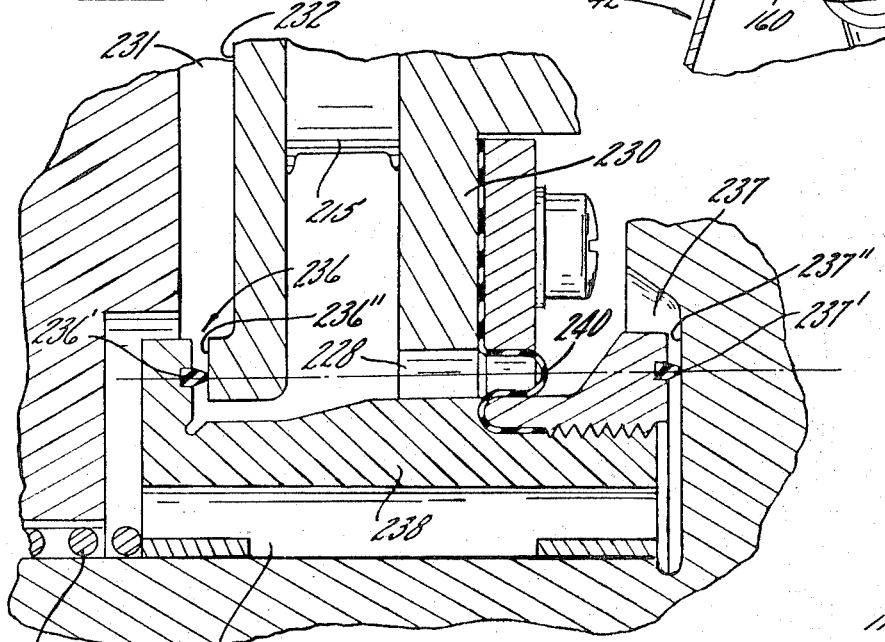
AIR VALVE AND
VACUUM VALVE CLOSED

INVENTOR.
EDWARD A. ROCKWELL

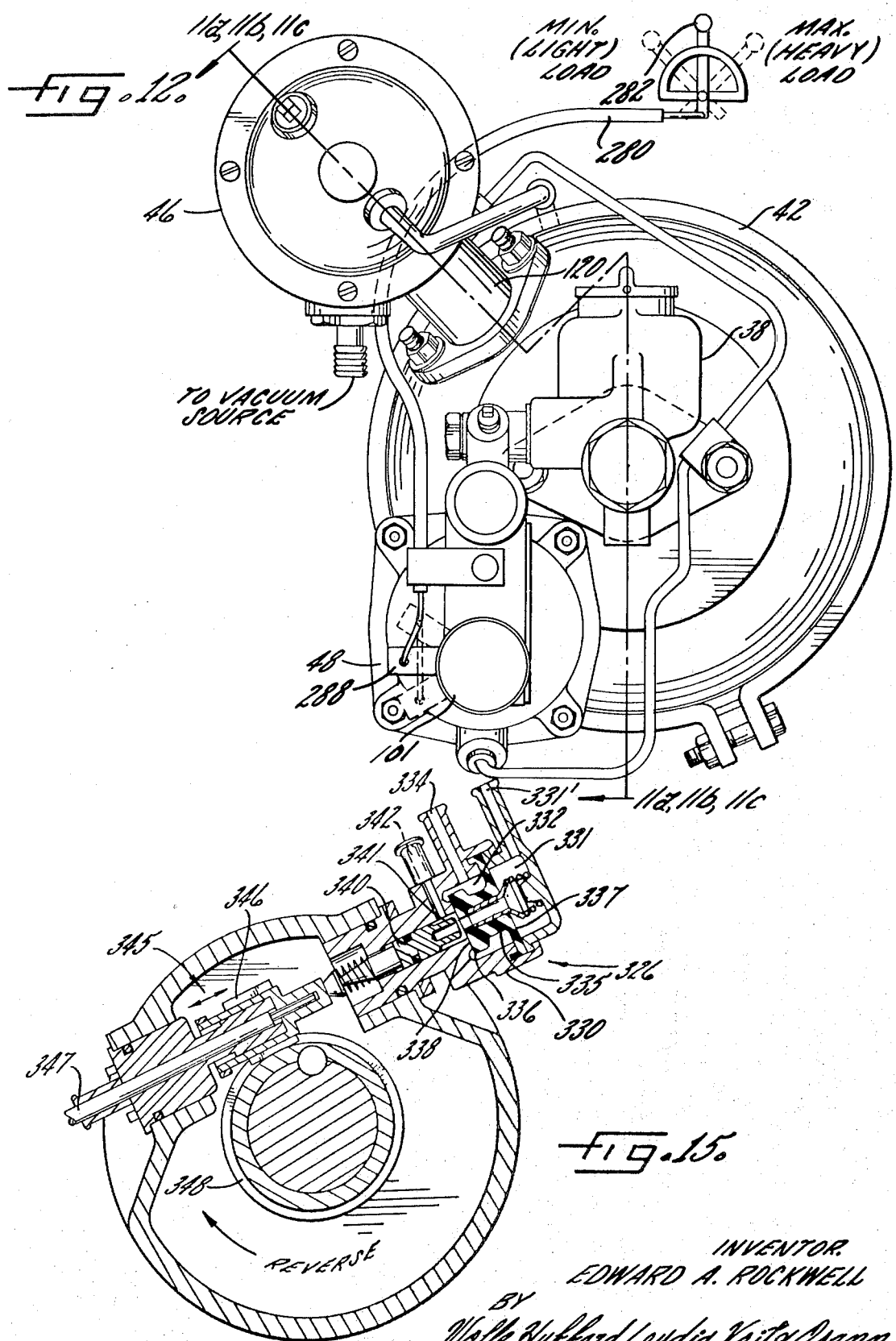

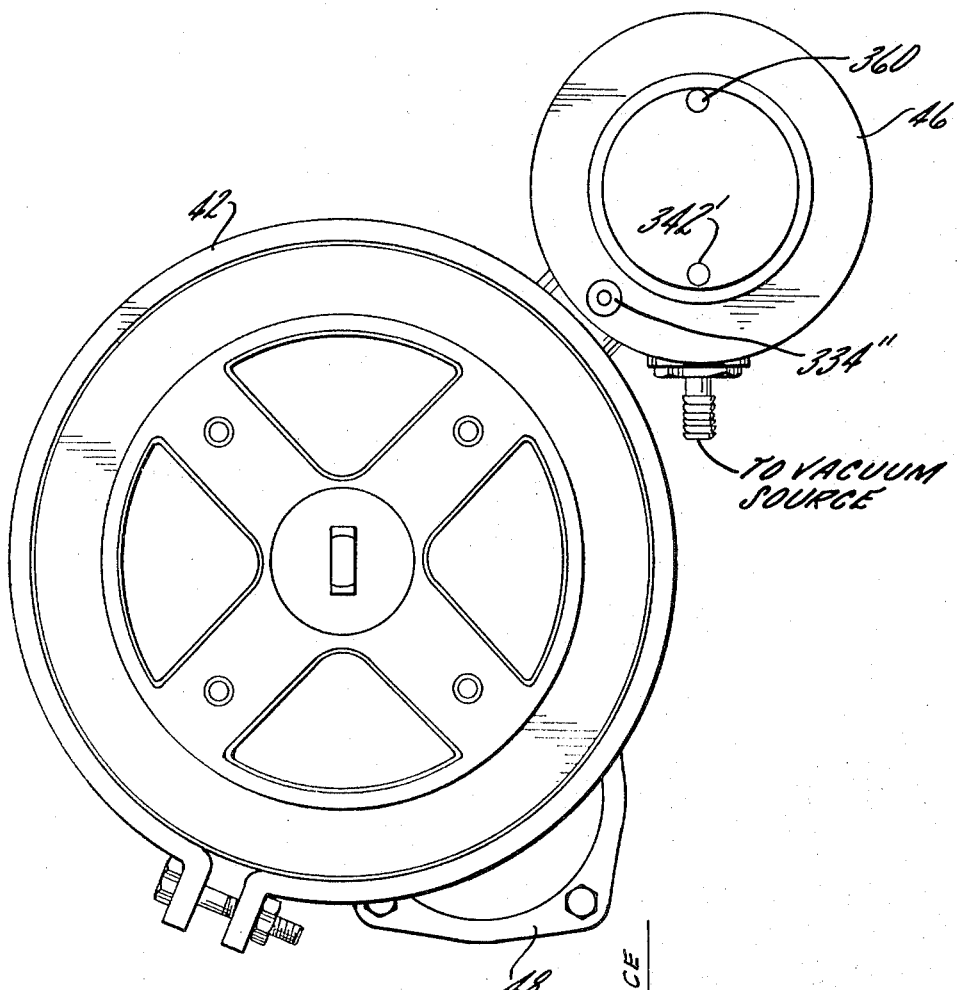
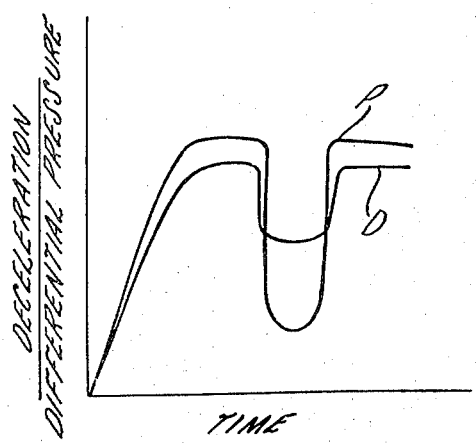

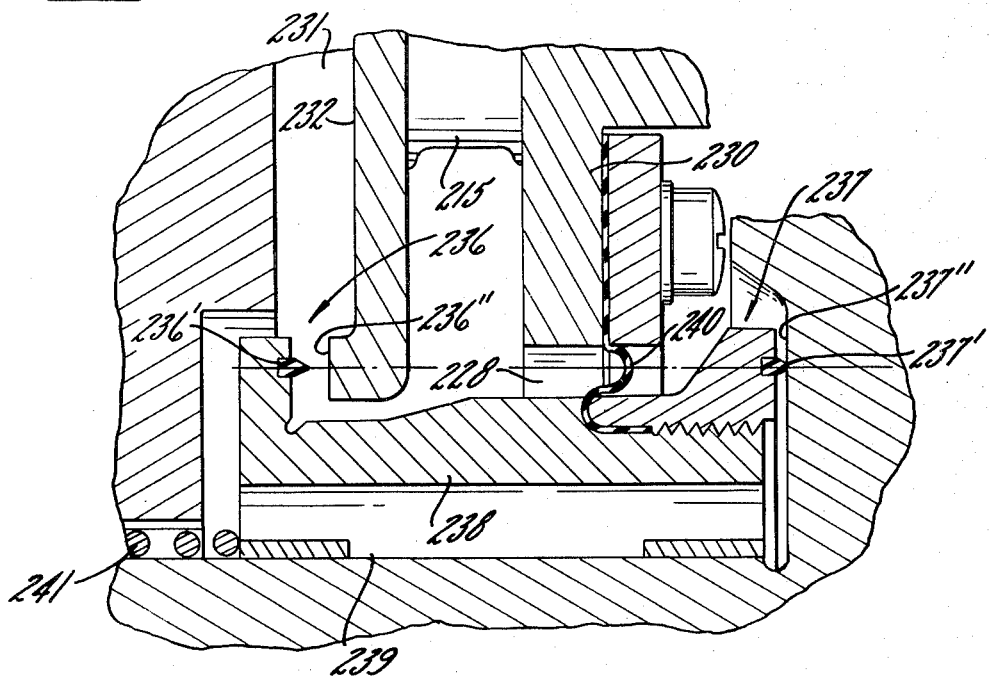
Fig. 14b. AIR VALVE OPEN
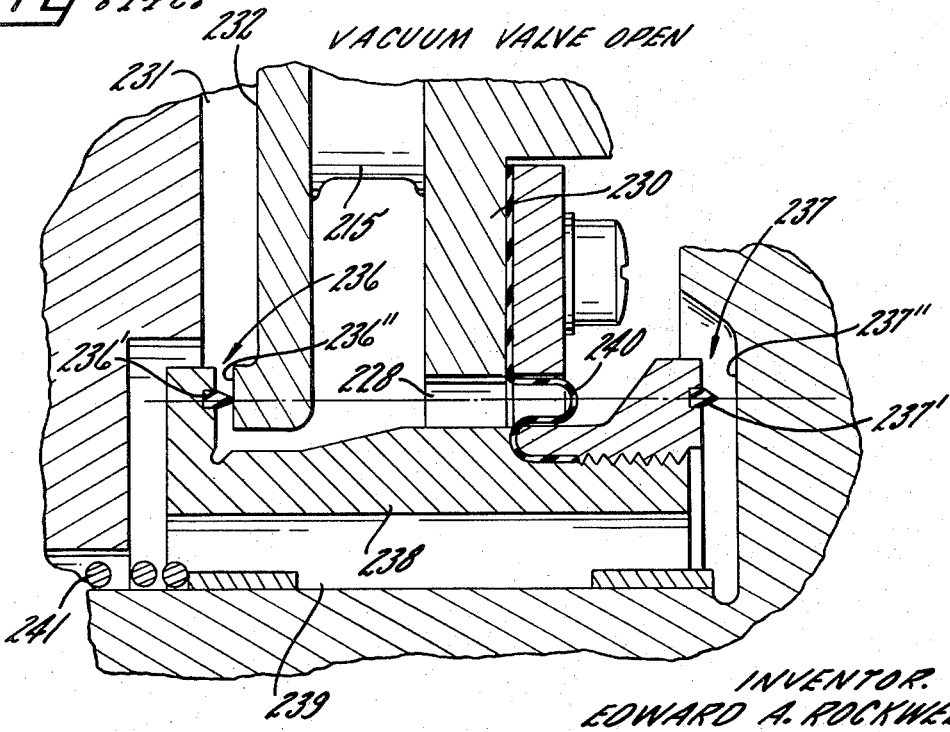
Fig. 14c. VACUUM VALVE OPEN

SKID CONTROL SYSTEM COMPONENTS

BACKGROUND OF THE INVENTION

This application is related to copending applications of Harvison C. Holland, Ser. No. 708,880, filed Feb. 28, 1968, entitled "Method for Producing Maximum Vehicle Deceleration", now U.S. Pat. No. 3,642,328, issued Feb. 15, 1972 and Ser. No. 54, 206, filed July 13, 1970, entitled "Variable Ratio Proportioning Device", and the copending application of Harvison C. Holland and Edward A. Rockwell, Ser. No. 83,732, filed Oct. 26, 1970 entitled "Skid Control Brake System".

Whereas copending application Ser. No. 83,732 directed to a "Skid Control Braking System" is the joint invention of Edward A. Rockwell and Harvison C. Holland, this application is directed to components and combinations of components for automobile braking skid control, and particularly, but not exclusively, components utilized in that Skid Control Braking System for sensing changes in vehicle deceleration indicating impending skidding and for operating various power actuated devices for skid control.

The present invention is, therefore, directed to improvements in vehicle power braking systems in general, and, in particular, to deceleration responsive means for controlling various power actuated components, as well as combinations of the deceleration responsive means with components that may be used in brake systems for automotive vehicles, including skid control brake systems.

Numerous automotive skid control braking systems have been devised in the past. In one type of system, a group of speed sensors are employed to detect the skid condition at each of the wheels, or at each pair of wheels of the automobile, and to modulate the fluid pressure for that wheel or wheel pair in response thereto. In that type of system the dual master cylinder which is also conventionally utilized, provides substantially equal front and rear brake line pressures. Valves are also sometimes utilized to vary the relationship of front to rear brake line pressures, but these devices typically provide a relationship consisting of two linear segments over the range of tire-road coefficient of friction values, and have no adjustment for disposable load in the vehicle.

However, an inherent problem associated with these types of braking systems is caused by the fact the relationship of front to rear braking forces does not account for the wide variation in tire-road coefficient of friction due to different road conditions, or vehicle loading, and typically provides optimum braking effect for only one or two conditions of tire-road coefficient of friction at one particular vehicle disposable load.

For example, under icy or glazed low tire-road coefficient of friction conditions, the maximum achievable braking effect and the weight shift to the front wheels at maximum braking will be low, and the front wheels will usually start to skid before the rear wheels begin to skid and thus before the maximum stopping force is achieved even for such poor braking conditions. Under dry road high tire-road coefficient of friction conditions, on the other hand, the maximum achievable braking effect and the weight shift to the front wheels at maximum braking will be high, and the rear wheels will usually start to skid before the front wheels start to skid.

With a conventional automobile having four wheels, with brakes at front and rear, according to the concept explained in copending application of Harvison C. Holland, Ser. No. 708,880, entitled "Method for Producing Maximum Vehicle Deceleration" for each distribution of disposable load there is only one optimum ratio of braking forces between front and rear for a given coefficient of friction between the tires and the road that will provide maximum deceleration. This is a fundamental relationship based upon the configuration of the vehicle and its braking system.

This relationship takes into consideration the weight-transfer effect during braking which tends to increase the downward force at the front wheels and lessen the force at the rear wheels even though the total downward force of the vehicle on the road is the same as when standing still. Since the maximum braking force obtainable from a given wheel is equal to the downward force on the road times the coefficient of friction between the tire and the road, it can be seen that the front wheels can provide a greater proportion of the total braking force, and the rear wheels a lesser proportion as the maximum adhesion obtainable between the tires and the road increases.

According to the invention described in copending application of Harvison C. Holland, Ser. No. 54,306, filed July 13, 1970 for Variable Ratio Proportioning Device, the stopping force relationship described above may be obtained with the conventional hydraulic brake system by including a proportioning device, shown as a valve connected in the brake lines. This proportioning device is supplied with high pressure fluid from the master cylinder of the brake system, and transmits fluid at regulated pressure to the rear wheel brakes. According to that invention, the fluid pressure in the brake lines to the rear brakes is varied according to a predetermined function of the brake line pressure supplied from the master cylinder, so as to vary the braking effect between front and rear wheels as vehicle deceleration changes. The device is effective to vary the ratio of the brake line pressures between the front and rear brake lines as a non-linear function of vehicle deceleration and is adjustable for disposable load to obtain the stopping force relationship derived by Harvison C. Holland and takes into account the weight and center of gravity characteristics of the vehicle, and the braking characteristics of the wheel brake mechanism with which the vehicle is equipped, in order to obtain optimum proportioning of braking force for maximum braking under all road and load conditions.

With a braking system having such a variable proportioning device but without skid detection and control, since the front and rear wheels both reach their maximum braking force at the same time, it is clear that both the front and rear wheels will begin to skid substantially simultaneously at a point when the braking force applied to the wheels as a result of increased pressures in the brake lines exceeds that required to produce the maximum stopping force achievable under the given tire-road friction conditions. It has, furthermore, been observed that the impending skid condition of the automobile caused by the start of wheel lock-up will be reflected in a sudden reduction in the rate at which the automobile decelerates.

DESCRIPTION OF THE INVENTION

The present invention relates generally to control devices and, more particularly, concerns a controller consisting of a decelerometer for measuring acceleration or deceleration and for producing a control pressure which varies as a function thereof and an augmentor for momentarily modifying, or augmenting, the control pressure upon a sudden reduction of deceleration. In a preferred, exemplary embodiment, this invention provides a decelerometer having a valve device operable to measure deceleration and produce a control pressure which varies as a linear function of deceleration and an augmentation device operable to momentarily modify the control pressure on sudden reduction of deceleration.

One of the principal objects of this invention is to provide acceleration or deceleration responsive valves which are capable of controlling sufficient flow of fluid to serve as a source of pressure fluid for operating power activated devices such as recording instruments or servo mechanisms without supplemental assistance.

Another principal object of the invention is to provide deceleration and change of deceleration responsive pressure fluid control means which is adapted to serve as a variable pressure fluid source for use in automotive brake systems having skid control features.

More directly stated, a general object of the present invention is to provide a decelerometer which is particularly adapted to function as a vehicle deceleration responsive control unit in an automotive brake system embodying a skid control system of the type described in said copending application Ser. No. 83,732. That system incorporates variable proportioning to vary the ratio of the brake line pressure between the front and rear brake lines as a non-linear function of deceleration to obtain minimum stopping distances under any road condition for any disposable load, and one of the objects of this invention is to provide a controller which will detect changes of vehicle deceleration that reflect an impending skid, on various types of road surfaces and responsive to such changes of deceleration will operate a power unit embodied in the system so as to reduce the braking force on all four wheels below the level which will cause wheel lock-up, to prevent skidding. Without variable proportioning of brake line pressures between rear and front brake lines which is provided for in the system, reducing braking force to prevent skidding responsive to deceleration changes of the vehicle itself would not allow optimum braking since such changes in deceleration would occur upon skidding of either front or rear wheels, whichever occurs first, and thus prematurely stop the skid. With provision in the system for variable proportioning and adjustment for changes in loading between front and rear brakes, detection of the deceleration changes due to impending skidding comes at substantially the exact point when maximum stopping force has been achieved.

A more specific object is to provide inertia-mass operated three-way valves to serve the function of decelerometers by producing a modulated control pressure which is a function of deceleration or acceleration. A related object is to provide such valves which are highly precise and fast in response to changes in deceleration.

A still more specific, but important, object is to provide highly sensitive deceleration or acceleration responsive three-way valves of the self-lapping type, actuated by an inertia-mass and so balanced by pressure responsive reaction elements to provide minimum valve travel so as to obtain maximum speed of operation. Another more specific object is to provide an improved construction for three-way valves, employing valve spools carrying an air supply valve and a vacuum supply valve, with the direction of fluid flow through both the air supply and vacuum supply valves producing forces of equal magnitude both of which oppose valve closing so as to obtain smooth valve operation and having the same response on increasing and decreasing pressures. Another more specific object is to provide an improved construction for deceleration or acceleration responsive valves which will have minimum hysteresis and provide smooth operation for pressure increases or decreases.

A further specific object is to augment the change in control pressure supplied by such valves in response to high rates of reduction of deceleration so as to increase momentarily the magnitude of change in control pressure output during impending wheel lock-up.

Another object of the present invention is to provide a separate control means associated with a decelerometer which is effective to "cut-in" and "cut-out" the action of the decelerometer, so as to confine operation to desired periods.

Yet a further object of the invention is to provide a decelerometer and a variable proportioning device which function together in a brake system to vary the ratio of front to rear brake line pressures as a function of deceleration, to achieve maximum stopping force for any given tire-road condition.

A more detailed object of this last aspect of the present invention is to provide a decelerometer and a variable proportioning device which function together in a brake system to control braking forces, wherein the proportioning device being controlled responsive to deceleration is operable to vary the ratio of braking forces produced by the front and rear wheel brakes as a non-linear function of tire-road coefficient of friction, which non-linear function substantially matches the Holland equation for $S_f/S_r$ to match the requirements of the vehicle to produce maximum deceleration under any given tire-road condition at various vehicle loadings.

Still a more detailed object of this aspect of the present invention is to provide the combination of a decelerometer and a variable proportioning device wherein the power required to operate the variable proportioning device is supplied by the decelerometer output, such that the force or power supplied by an operator to the brake pedal is wholly available to increase the brake line pressure within the braking system.

A further object of the present invention is to have the decelerometer simultaneously control (1) the power wall assembly of the power booster in response to changes in deceleration indicating impending wheel lock-up, to momentarily reduce the braking force and then to increase the braking force and thereby modulate the braking force about the tire-road skid point, and, (2) the variable proportioning device to vary the ratio of braking forces produced by the front and rear brakes as a non-linear function of deceleration, which function substantially matches the Holland equation for $S_f/S_r$, to match the requirements of the vehicle as loaded to produce maximum braking force and hence deceleration under any given tire-road condition.

A further object is to utilize the decelerometer output pressure for controlling the supply pressure utilized to operate the power booster and to limit the differential between the supply pressure and the power chamber pressure to a substantially constant positive value of small magnitude, so as to inhibit "spiking".

Other objects will become evident from the following description taken in connection with the accompanying drawings in which:

FIG. 6 is a graph of front brake line system pressure plotted against rear brake line system pressure;

FIG. 8 is a graph of coefficient of friction plotted against slip ratio;

FIG. 9 is a graph showing two pressure curves plotted against deceleration, one for the controller and one for the power booster;

FIG. 10 is a schematic view of the components as they may be combined to form a skid control system;

Figures 6, 8, 10:
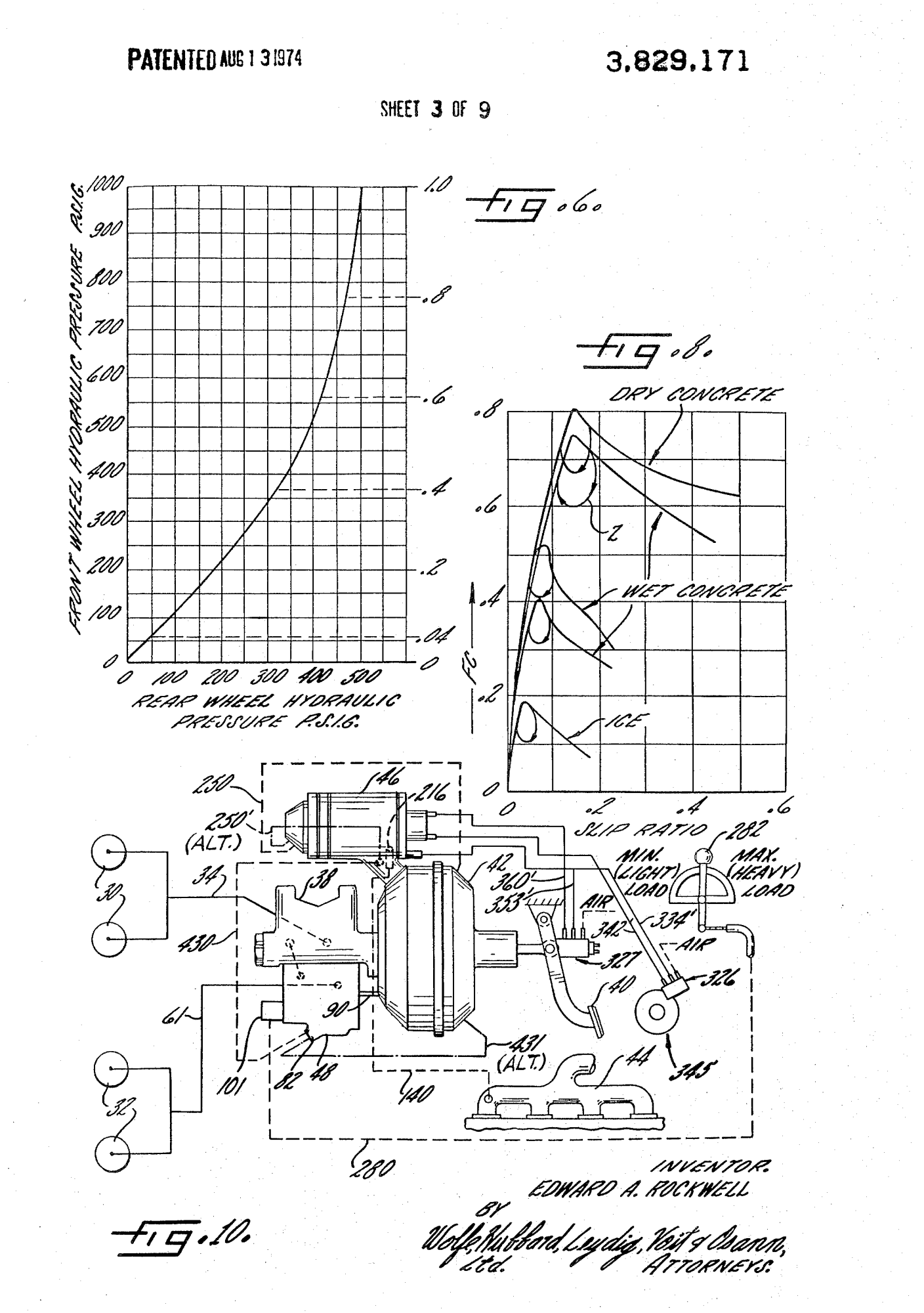
Figure 11C:
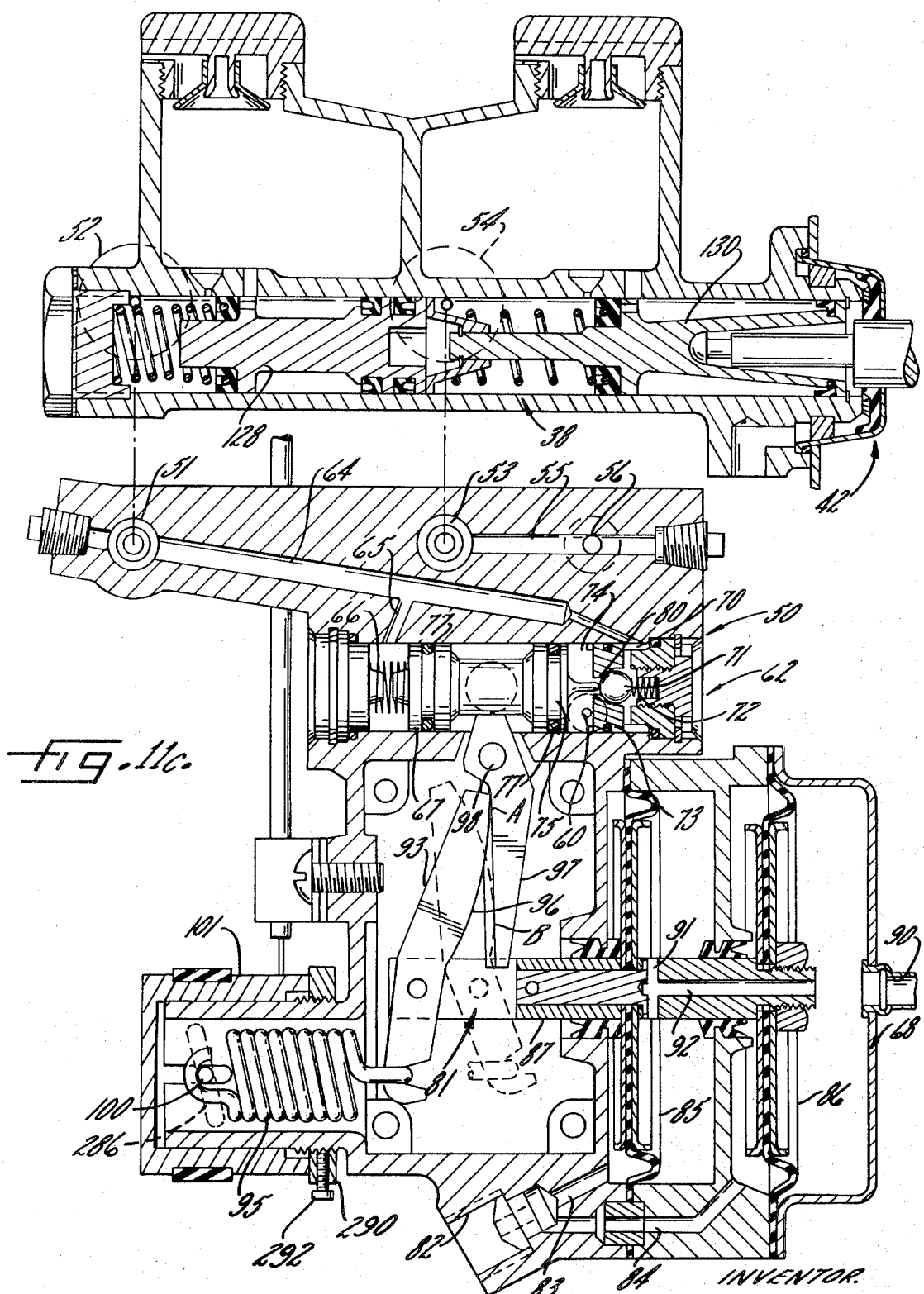

FIGS. 11a, 11b and 11c taken together are cross-sectional views with portions shown in elevation of the power booster, controller, master cylinder, and proportioning device components incorporated in the skid control system shown in FIG. 10 schematically;

FIG. 12 is a front view of the power booster, master cylinder, distribution device and controller assembled as a complete unit;

FIG. 13 is a rear view of the complete unit shown in FIG. 12;

FIGS. 14a, 14b and 14c are enlarged fragmentary views of the three-way valve included in the controller shown in cross-section in FIG. 11b in different positions;

FIG. 15 is a fragmentary view showing a speedometer cable take-off mechanism and pressure control valve associated with the controller shown in FIG. 11b;

FIG. 16 is a graph of deceleration and supply pressure plotted against time for the controller; and FIG. 17 is a graph of valve closing plotted against valve opening distance.

THE SYSTEM IN GENERAL

Now turning to the drawings, FIGS. 1–10 are schematic illustrations and graphs to assist in the explanation which will be given of the Holland method of producing maximum vehicle deceleration, which method has been followed in the development of the components of the braking system schematically shown in FIG. 10.

In general, by following the Holland method, a brake system has been developed which varies the proportioning of braking forces front to rear in a manner determined by the configuration of the particular vehicle on which the system is used, so as to match the requirements of that vehicle to produce maximum deceleration under any given road conditions. Since with a braking system having such variable proportioning, the front and rear wheels both reach their maximum stopping force at the same time, both the front and rear wheels will begin to skid simultaneously at a point when the braking force applied to the wheels through the brake system exceeds the maximum stopping force that can be developed at the road surface under the prevailing coefficient of friction conditions. It has been observed that the impending skid caused by the start of wheel lock-up when the tires break free of the road surface will be reflected in a sudden change of the rate at which the vehicle decelerates. According to an aspect of the present invention a controller that is responsive to sudden reduction in deceleration of the vehicle is utilized to modulate the total braking forces applied by the system about their maximum points at both front and rear wheels to maintain substantially maximum vehicle deceleration without skidding.

The hydraulic brake system shown substantially in FIG. 10 includes the conventional elements of front and rear brakes 30, 32, separate front and rear brake lines or sub-systems 34, 36 and a dual master cylinder 38 producing front and rear brake line pressures in response to application of the brake pedal 40 by the operator.

In addition, the brake system includes certain elements and combinations of elements which are constructed according to the present invention. Thus, a power booster 42 actuated by the brake pedal 40 to provide power assist to operate the dual master cylinder 38, is controlled by a controller 46 which functions independently of and in conjunction with the booster control valve to modulate the total braking forces to maintain substantially maximum deceleration without skidding.

According to the present invention, the controller 46 controls the flow of air supplied via the manually operated booster control valve to the power chamber to operate the power wall of the booster in two of its operating conditions. First, over the full range of brake application below the skid point, the controller limits the differential between the supply pressure, conveyed to the booster control valve, and the power chamber pressure, in order to inhibit spiking or extremely fast and hard braking. Second, in the condition of brake operation reflecting an impending skid, the controller momentarily reduces the supply pressure to produce a negative differential between the supply pressure and the power chamber pressure causing the power chamber pressure to drop and thereby returning the power wall and reducing the braking force on all four wheels below the level which will cause wheel lock-up, to prevent skidding. As the supply pressure increases after momentary reduction, the controller reproduces a positive differential between the supply pressure and the power chamber pressure, such that upon normal continued manual application of the brake pedal the booster power wall is reapplied to reapply the braking force, the cycle of production of positive and negative values of differential pressure being repetitive. In all other operating conditions, the manually operated booster control valve controls booster operation in a substantially conventional manner.

Further in accordance with this invention, the skid controller controls a proportioning device 48 which is operable to vary the braking force front to rear to match the stopping force requirements front to rear established for that particular vehicle as prescribed by the method of producing maximum vehicle deceleration set forth in detail in copending application of Harvison C. Holland, Ser. No. 708,880, entitled Method for Producing Maximum Vehicle Deceleration, filed Feb. 28, 1968. A brief description of that Holland Method is included for purposes of fully explaining the present invention.

THE HOLLAND METHOD

The Holland concept as set forth in said application Ser. No. 708,880 is based upon the discovery that for any vehicle having front and rear brakes, there is one (and only one) front to rear stopping force ratio that will produce maximum deceleration at each coefficient of friction between the tires and the road. This is a fundamental relationship and takes the form of the following equation:

$$S_f/S_r = (Y + F_c Z)/(X - F_c Z)$$

where Y is the horizontal distance from the rear wheels to the center of gravity of the vehicle. X is the horizontal distance from the front wheels to the center of gravity, Z is the vertical distance from the road surface to the center of gravity, and $S_f$ and $S_r$ are the stopping forces at the front and rear tires respectively due to tire-road friction, and $F_c$ is the coefficient of friction between the tire and road.

Figure 1:
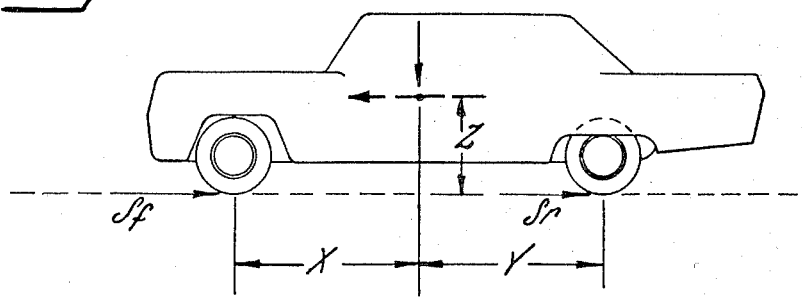
FIG. 1 is a schematic representation of a vehicle during deceleration.

Briefly detailing the concept more fully explained in said application, referring to FIG. 1, the friction between the front and rear tires and the surface of the road enables a vehicle to be braked to a stop by braking forces applied to the wheels through the braking system. Hereinafter, where the term "stopping force" is used, that term refers to the reaction force applied to the tires by the road surface to stop the vehicle, while the term "braking force" refers to the force applied to the wheels to brake the wheels by the wheel brake mechanism. The stopping force $S_f$ at the front wheels produced as the vehicle decelerates is equal to the vertical reaction at the front wheels times the coefficient of friction $F_c$. Thus $S_f = F_c R_f$. Similarly, the stopping force $S_4$ at the rear wheels equals the product of vertical reaction and the coefficient of friction, so that $S_r = F_c R_r$.

Knowing these relationships and taking a summation of forces and moments about the center of gravity, the Holland equation for $S_f/S_r$ can be derived.

Next, in order that this equation may be utilized, the location of the center of gravity is determined for a given vehicle at a given loading, which may be accomplished as described in said copending application Ser. No. 708,880.

Figure 2:
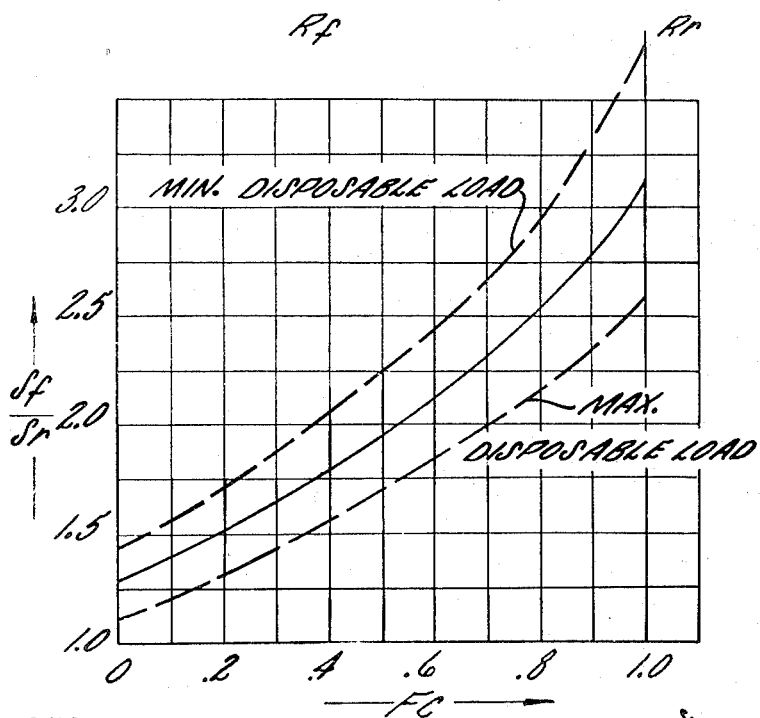
FIG. 2 is a graph of the ratio $S_f/S_r$ plotted against various coefficients of friction $F_c$ between the tires and the road for an exemplary vehicle.

Having determined the distance dimensions X, Y and Z of the center of gravity from the wheels and the road surface, a compilation then is made the ratio of the maximum obtainable stopping force at the front wheels to that at the rear wheels for various coefficients of friction between the tires and road, using the equation for $S_f/S_r$. The coefficients of friction are selected within the range that will be experienced between the tires and the road during operation of the vehicle. Preferably a curve of this information is plotted as illustrated in FIG. 2.

From the equation for $S_f/S_r$, the following additional relationships may be derived, wherein W is the total weight of the vehicle:

$$S_f = \frac{F_c W}{1 + \dfrac{1}{\dfrac{S_f}{S_r}}} \quad \text{and}$$

$$S_r = F_c W - S_f$$

Figure 3:
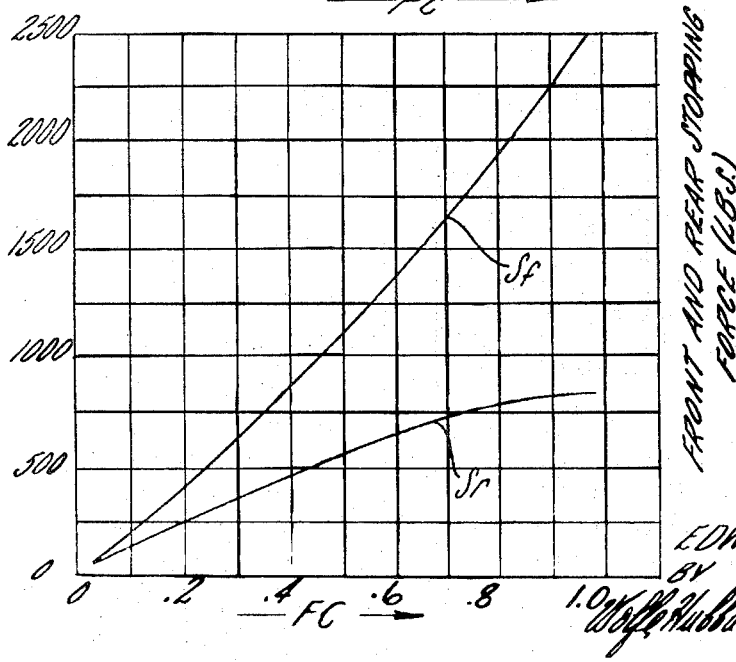
FIG. 3 is a graph showing two curves, one curve represents $S_f$ plotted against $F_c$ and the other curve represents $S_r$ plotted against $F_c$.

With these latter equations, data may be obtained indicating the maximum stopping force obtainable at the front wheels and at the rear wheels as a function of the coefficient of friction of the tires relative to the road. In so doing, values are taken from the curve of FIG. 2 and inserted into the two formulas for $S_f$ and $S_r$ noted immediately above. Again, preferably, curves are drawn for the front and rear wheels as indicated in FIG. 3. This represents the ideal condition, i.e. the highest values of stopping forces front and rear that are possible at various coefficients of friction for the vehicle in question.

Figure 4:
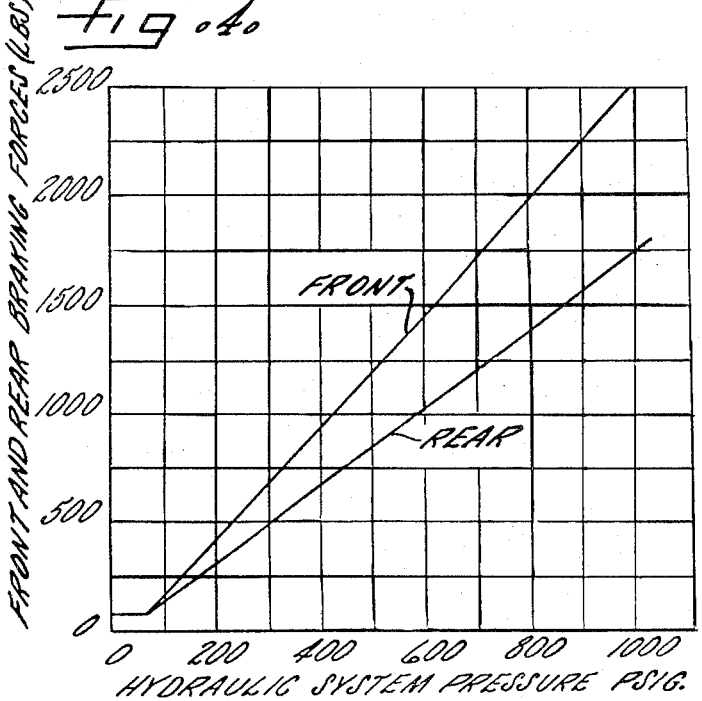
FIG. 4 is a graph also illustrating two curves, front and rear braking force, respectively, plotted against hydraulic system pressure.

With this in mind, actual braking force values at various hydraulic pressures in the braking system of a particular vehicle are secured through the use of a dynamometer, by rotating the wheels and measuring the resistance to movement produced by the brakes at different hydraulic pressures. A conventional dynamometer may be used for these measurements. Using these readings of the hydraulic system pressure and braking force, curves preferably are plotted as shown in FIG. 4 illustrating the relationship between hydraulic system pressure and actual braking force for the systems for the front and rear wheels of a given vehicle.

To produce maximum vehicle deceleration, according to the Holland method the actual braking forces produced at the front and rear wheels by the hydraulic brake system of the vehicle (which is graphically shown in FIG. 4) should be controlled by means incorporated in the system so that the relationship of braking force front to rear matches the relationship of stopping force front to rear shown in FIG. 2. Ideally, the actual braking force relationship front to rear should be varied to match the variation in stopping force relationship front to rear shown in FIG. 2. Understanding this aspect is the key to understanding the Holland method.

Putting it another way, when the relationship of braking force front to rear is varied to agree with the required stopping force relationship front to rear illustrated in FIG. 2, maximum vehicle deceleration will be produced under any given tire-road coefficient of friction up to the skid point. With this fact in mind, the next step in the Holland method is to determined how the stopping forces which are required (FIG. 3) can be produced with the given vehicles' hydraulic brake system (FIG. 4). This step can be carried out by cross-plotting the curves in FIG. 3 and the curves in FIG. 4, which produces the curves of FIG. 5.

Figure 5:
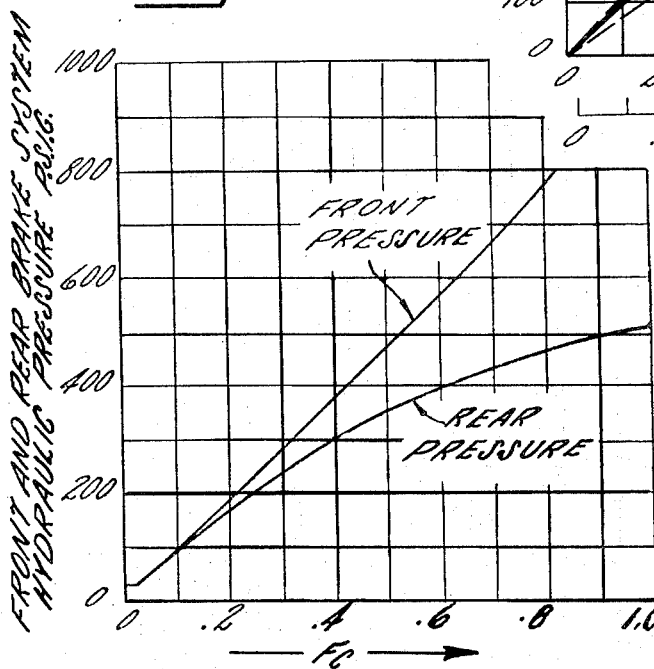
FIG. 5 is a graph also illustrating two curves, front brake system pressure and rear brake system pressure, respectively, plotted against $F_c$.

Accordingly, the curves of FIG. 5 illustrate the required hydraulic pressures in the front and rear braking systems to produce maximum vehicle deceleration at various tire-road coefficients of friction. In other words, FIG. 5 shows in two curves the relationship between the front hydraulic pressure and the rear hydraulic pressure required to produce the relationship of maximum stopping forces $S_f/S_r$ at any given tire-road coefficient of friction $F_c$. This relationship of front brake line hydraulic pressure to rear brake line hydraulic pressure can be plotted on a single curve using the values on FIG. 5, as shown in FIG. 6, which graph also illustrates the relationship of $F_c$ to rear brake line hydraulic pressure.

According to the Holland method of obtaining maximum vehicle deceleration at any given tire-road coefficient of friction, maximum vehicle deceleration will be obtained by matching the braking force relationship front to rear produced by the brake system to the stopping force requirements front to rear established for that particular vehicle by the Holland equation for $S_f/S_r$. Since the stopping force ratio $S_f/S_r$ varies as a non-linear function of coefficient of friction, the braking force ratio varies as a non-linear function of coefficient of friction (as shown in FIG. 6), total braking force, and vehicle deceleration. Furthermore, since the maximum total braking force that can be applied without wheel lock-up is determined by the maximum tire-road coefficient of friction that can be developed at any given road condition between the tires and the road, the ratio of the front to rear braking force to obtain maximum deceleration without skidding will be a function of the maximum tire-road coefficient of friction.

It will also be observed that for any distribution of disposable load in the vehicle, at each coefficient of friction between the tire and the road, there is a single value of braking force that can be applied to the front and a corresponding value of braking force that can be applied to the rear wheels to achieve maximum deceleration of the vehicle without resulting loss of adhesion between the tires and the road. Under dry, paved road conditions (where the value of $F_c$ approaches unity) the ratio of front-to-rear braking force is at a maximum. Under other conditions, such as on wet pavement or ice (where the value of $F_c$ approaches zero), the lower coefficient of friction results in less weight-transfer effect and, consequently, a different distribution of downward tire forces between front and rear, even though the total downward force of the vehicle remains the same. It can, therefore, be seen that the proportioning of braking force between front and rear which is most effective under one condition will not be correct for another condition where a different coefficient of friction is encountered. It is for this reason that conventional hydraulic braking systems with fixed proportioning of braking forces front to rear inherently cannot achieve maximum deceleration. If a braking system is set up to proportion front-to-rear forces to give maximum braking under maximum tire-road friction conditions, with a relatively larger proportion of braking force applied to the front wheels, the use of the same ratio under low friction conditions such as on ice covered pavement will result in an excessive proportion of braking force at the front wheels and consequent underutilization on the rear wheels or impending skidding of the front wheels before the rear wheels are utilized to maximum braking effect. On the other hand, if the fixed proportion is set up to a favor lower friction conditions, then an attempted maximum stop under more favorable friction conditions will result in exceeding the adhesion capability of the rear tires by producing a greater proportion of braking force than they can accommodate without skidding. These pressure limiting devices produce a non-continuous front-to-rear brake force relationship. Since the ratio of front-to-rear braking forces (and consequent hydraulic pressures) required for maximum vehicle deceleration on various types of road friction surfaces does not vary linearly with the tire coefficient of friction, and is a continuously This results not only in losing the optimum stopping distance for the vehicle, in the absence of anti-skid control, it also increases the dangers of losing control of the vehicle because the skidding rear wheels will tend to induce a spin.

In conventional hydraulic brake systems for automotive vehicles, by the simultaneous application of fluid pressure from a master cylinder to individual slave cylinders in the brake mechanisms of each wheel, the brakes are applied concurrently providing equal or directly proportional braking forces at the front and rear wheels depending upon the relative size of the front and rear slave cylinders. It is also common practice to separate the hydraulic systems between front and rear to assure the operation of one pair of brakes in case the other hydraulic system fails. However, in these split systems, interconnection of the two master cylinders is provided to assure substantially equal front and rear pressures. Occasionally pressure limiting devices and other means have been inserted in the rear brake system to limit maximum rear brake system pressure, or otherwise modify the front to rear braking force relationship in some arbitrary manner. These pressure limiting devices produce a non-continuous front-to-rear brake force relationship. Since the ratio of front-to-rear braking forces (and consequent hydraulic pressures) required for maximum vehicle deceleration on various types of road friction surfaces does not vary linearly with the tire coefficient of friction, and is a continuously varying ratio, as shown in FIG. 6, none of these systems can provide optimum braking effect except at one or two values of coefficient of friction, and must necessarily produce non-optimum results for all other road conditions.

Turning again to FIG. 6, this graph illustrates values of concurrent front and rear hydraulic system pressure at any value of coefficient of friction $F_c$ for an exemplary vehicle weight, configuration and hydraulic brake system, and which will provide maximum vehicle deceleration. It will be observed that these pressures are not simple straight line relationships, but rather a family of continuous curves of a more complex nature, and are determined for a particular vehicle and not by any arbitrary equalization or non-equalization factor within the braking system for proportioning the braking forces between front and rear.

POWER ACTUATED DEVICES

In accordance with this invention, the vehicle braking system is provided with a power actuated variable proportioning device to vary the ratio of braking forces front to rear to match the vehicle's requirements for maximum braking, and with a power booster device to assist manual effort in applying the braking forces, both said devices being preferably controlled and operated by a controller consisting of a decelerometer and an augmentor which senses vehicle deceleration and produces a supply pressure for power actuation of both said devices.

VARIABLE RATIO PROPORTIONING DEVICE

Turning first to the device for varying the ratio of braking forces front to rear shown schematically in FIG. 10 and in detail in FIG. 11c, this device 48 is adapted for direct mounting to the master cylinder 38 as shown, or it may be mounted on the vehicle and connected with conduits of the conventional type used for vehicle brake lines. As shown herein, the device 48 has a housing 50 having an inlet port 51 for high pressure from the master cylinder rear port 52, and a second inlet port for high pressure from the master cylinder front port 54, with the respective inlet ports being in line with the master cylinder ports so that a conventional coupling or connection (not shown) can communicate the respective ports as well as secure the device 48 to the master cylinder 38.

Because the proportioning device 48 varies the ratio of the front brake line pressure relative to the rear brake line pressure by regulating the rear brake line pressure, the master cylinder front port may communicate through the inlet 53, a drilled passage 55 and an outlet port 56 directly to the front wheel brakes 30 by means of the conduit 34 (FIG. 10) which is suitably connected to the outlet port 56 by a conventional connector (not shown). The device 48 also has a rear outlet port 60 for the rear brake line 61 that is connected to the rear brakes 32.

Variable proportioning is obtained by a regulating valve means 61 which is contained within the housing 50 and regulates the fluid pressure in the outlet port 60 to the rear brake line 61 as a non-linear function of the force produced by an independently operated power actuated means indicated generally at 68, which is operated by an outside source. From the rear high pressure inlet 51, pressure fluid is directed through passages 64 and 65 in the housing 50 into a first cylinder 66 containing a piston 67. The passage 64 also carries high pressure fluid from the inlet 51 into a check valve chamber 70 containing a check valve ball 71 urged by a spring 72 into sealing contact with an opening forming a seat 73 for the ball 71 and leading to a regulated pressure cylinder 74 containing a second piston 75. The regulated pressure cylinder 74 supplies the rear outlet port 60. Both pistons 67 and 75 are provided with seals 77 made of TEFLON or other low friction material, and in the illustrated device, the pistons are constructed as a single coaxial piston shuttle with the pressure faces of the pistons oppositely disposed and of equal size so that the pressure forces on the shuttle from the high pressure cylinder 66 and the regulated pressure cylinder 75 are in direct opposition. A pin 80 is carried by the second piston 75 which contacts the check valve ball 71.

With the structure thus far described, the valve would operate as a fixed ratio proportioning device utilizing high pressure forces on the first piston 67 which tend to urge the piston shuttle to the right and regulated pressure forces in the pressure cylinder 74 acting on the second piston 75 which tend to urge the second piston and thus the piston shuttle to the left. When the inlet pressure forces on the first piston exceed the regulated pressure forces on the second piston, the piston shuttle will be displaced to the right, moving the ball 71 off its seat 73 and allowing high pressure from the passage 64 to pass through the chambers 70, 74 to the regulated pressure outlet 60. Since as shown the opposing pistons have substantially the same area, in the absence of means to vary the ratio the valve would provide a fixed proportioning ratio of unity between the inlet and outlet pressures. Such a means for varying the ratio is included, herein shown as the independently operated power actuated means 68 which includes a diaphragm assembly 63, and a spring, cam lever arm and connecting means assembly 81 for applying a variable biasing force to the piston shuttle, for varying the proportioning ratio (and the front-to-rear braking force) as a non-linear function of the varying power or pressure force from an outside source, which applied power or force varies in a known relationship to variations in said inlet 51 pressure, so as to vary the ratio of the regulated outlet pressure to the inlet pressure to match the non-linear function.

As will hereinafter be described in more detail, the decelerometer portion of the controller included in the braking system and constructed in accordance with the invention produces a pneumatic output or supply pressure when the brakes are applied that is directly proportional to the deceleration of the vehicle. Preferably, the decelerometer portion of the controller is utilized as a source for the proportioning device, since there will be a known relationship between brake line pressure and deceleration. However, the pressure in the power chamber within the power booster included in the braking system is directly proportional to the force being applied to the master cylinder, the brake line pressure, and the braking force applied by the wheel brakes. Alternatively, therefore, the power chamber of the booster may be used as the source of supply fluid pressure to the diaphragm assembly 63.

Whichever source of variable air supply pressure is utilized, it is connected to an inlet port 82 which supplies the pressure to the diaphram assembly 63. The supply pressure is communicated through the passages 83 and 84 to the left sides of two independent diaphargams 85 and 86 which are tandomly connected to a common axial movable shaft 87. The right sides of the diaphragms 85 and 86 are connected through the conduit 90 to a source of vacuum, with the right side of diaphragm 85 communicating through passages 91 and 92 to the right side of diaphragm 86.

The force produced by the diaphragm assembly is transmitted via the assembly 81 which modifies that force according to the shape of the cam lower arm 93 to produce a variable biasing force which acts on the piston shuttle. To this end, the cam lever arm 93 has at one end a hook 94 to which a biasing spring 95 is attached. At the other end, the cam lever arm has a cam surface 96, which is urged by the biasing spring against a connecting means consisting of a lever arm 97 which is pivoted on pin 98 attached to the housing and applies a variable biasing force to the piston shuttle.

With a vehicle of known size, weight, load distribution and wheel brake mechanism, the biasing spring 95 is selected and the shape of the cam surface 96 on the cam lever arm 93 is determined as described in said copending application Ser. No. 708,880 of Harvison C. Holland so that the contact point of engagement with the lever arm 97 is moved in response to the fluid pressure from the outside source represented by the motion of the diaphragms 85 and 86 (and, therefore, the shaft 87) in a manner which varies the biasing force applied to the piston shuttle. In this way, the ratio of front to rear brake line pressures is varied as necessary to match the specifications therefor as shown for example in FIG. 6 and thereby match the stopping force requirements for both front and rear wheels to achieve maximum deceleration.

The biasing spring 95 is anchored to the housing 50 on a support bar 100 and exerts a force tending to move the cam lever 93 clockwise as seen in FIG. 11c. The cam surface 96 of the cam arm is thus urged to the right and contacts the lever arm 97 at points along its length depending on its position as determined by the motion of the shaft in response to the fluid pressure moving the diaphragms and the shaft 87.

In operation, with a relatively low hydraulic pressure representing relatively small force applied to the brake pedal and small total braking forces resulting in low rates of deceleration, the diaphragm assembly 63, spring 95, cam lever arm 93 and connecting means elements 81 will assume the position shown in solid lines in FIG. 10 with the contact point between the lever arm 97 and the cam lever arm 93 at point A. It can be seen that in this position the mechanical advantage of the biasing spring 95 in acting to move the piston shuttle to the left is small, because the contact point A is toward the tip of the cam lever arm, and near the point of the lever arm. At higher rates of deceleration produced by higher total braking forces, however, the diaphragms 85, 86 will move the shaft 87 to the right, shifting the cam lever arm 93 to some alternate position as indicated in phantom and moving the contact point to B. Here the contact point is in a position which gives the biasing spring 95 a greater mechanical advantage in urging the piston shuttle to the left, increasing the biasing force by an amount greater than the increase in the force of the spring and thus the proportioning of the hydraulic pressures achieved by the device will be correspondingly different. As the biasing force on the piston shuttle is increased through the movement of the shaft 87 to the right under increased fluid pressure, the ratio of inlet to outlet pressures will become greater; that is, the outlet pressure to the vehicle's rear brakes will be diminished in a non-linear manner as a function of vehicle deceleration.

It is to be noted that for safety considerations, the device is constructed whereby there will be no proportioning and therefore no drain of power to perform proportioning in the event a loss of vacuum occurs. Such a loss would result in a pressure approaching atmospheric pressure on the right sides of the diaphragms 85 and 86 enabling the biasing spring 95 to act on the cam lever arm 93 urging it to the left as shown in position A. In this position the biasing force on the piston shuttle is minimized and the piston 75 having the pin 80 will move the ball 71 off its seat when fluid pressures in the passages 64 and 65 increase to maintain full pressure in the rear brake lines.

Figure 7:
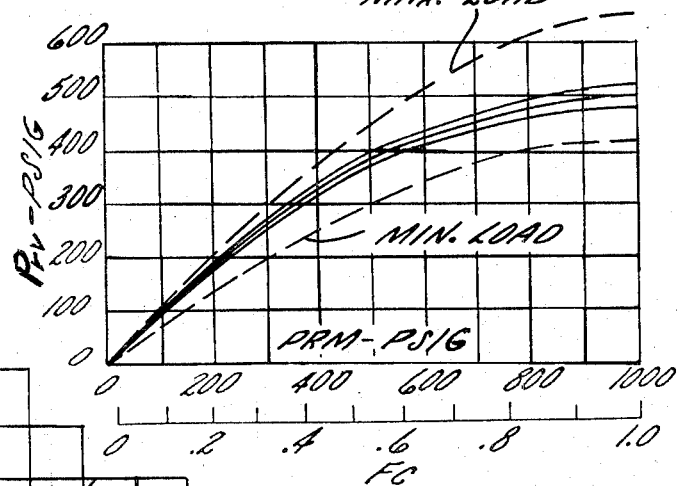
FIG. 7 is a graph illustrating design curves for the proportioning device.

The values for the biasing spring 95 and the specific shape of the cam surface 96 are calculated to produce in the operation of the proportioning device the relationship of front wheel hydraulic pressure to rear wheel hydraulic pressure specified for the particular vehicle on which the device is to be installed. For example, the device may be devised to produce the relationship of front to rear wheel hydraulic brake pressures as shown in FIG. 6 for an exemplary automobile and conventional hydraulic brake system. FIG. 7 is a design curve for a proportioning device constructed to obtain the front-to-rear wheel hydraulic pressure relationship illustrated in FIG. 6. Thus a cam surface for the cam lever of the proportioning device is calculated to produce pressure in the rear brake lines ($P_{rv}$) at various inlet pressures from the master cylinder ($P_{rm}$). It is noted that the cam surface may be changed to compensate for non-linearities within the braking system, for example, a non-linearity between deceleration of the vehicle and brake line pressure, or a non-linearity between brake line pressure and braking forces. Thus, the cam surface may be calculated to give whatever characteristic is desired between brake line pressure varies braking force, so long as the power source to the power actuated means 68 varies in a known relationship to variations in brake line pressure.

The fluid pressure controlled by the proportioning device will lie within a hysteresis band caused by the delay in opening and closing the check ball valve due to the friction inherent in all moving mechanisms. Based on pressure, spring, and friction force data for the parts of the device, the upper and lower curves are included in FIG. 7 to define the hysteresis band within which the device should operate. The proportioning device also includes a rotatable end cap 101 which is adjustable to adjust the tension on the biasing spring. The rotatable end cap should be in the mid position for the design curve of FIG. 7 which is the middle curve shown in that graph. Rotating the end cap 101 in either one direction or the other raises or lowers the $S_f/S_r$ curve of FIG. 2 (as illustrated by the dashed curves) to take into consideration vehicle loading, or changes in the brake system or in tire characteristics of the vehicle.

To aid in understanding what is achieved by variable proportioning of brake line pressures in conjunction with control of the total braking force responsive to deceleration, reference is made to FIG. 8 which is a graph of coefficient of friction ($F_c$) plotted against slip-ratio, which is the ratio of the velocity of the tire with respect to the road surface at the point of contact. FIG. 8 is based on test curves published by NASA in report TRR-20 (1959) for aircraft tire-runway performance, and is believed generally representative of automobile tire-road performance. FIG. 8 shows the relationship between coefficient of friction and the amount a tire crawls, slips or slides along the road surface. From FIG. 8 it will be noted that to achieve maximum stopping force at the tire-road surface, a peak value of coefficient of friction must be developed by the application of sufficient braking force to produce the slip-ratio corresponding to that peak value for a given tire and road surface. One objective of variable proportioning as the term is used herein, is to achieve the peak value of coefficient of friction at both front and rear wheels, so as to achieve maximum stopping force at both front and rear wheels. It will also be observed from FIG. 8 that with variable proportioning, applying a total braking force which exceeds that producing the peak value of coefficient of friction will result in an unstable condition since an increase in slip-ratio results in a decrease in coefficient of friction which will, in turn, produce more slip and the start of wheel lock-up.

To prevent wheel lock-up and vehicle skidding, the total braking force is reduced at the start of wheel lock-up which occurs simultaneously at both front and rear wheels; the total braking force is momentarily held at a lower value to allow the tires to achieve a slip ratio below the peak of the coefficient of friction curve; and then, the total braking force is again increased to achieve the peak coefficient of friction. This cycle is repeated with the result through variable proportioning of modulating the maximum braking forces at both the front and rear wheels about their maximum to maintain maximum deceleration without skidding.

For sensing that wheel lock-up has started, means are included in the system to respond to changes in deceleration of the vehicle. According to the present invention, the deceleration responsive control means takes the form of a pneumatic controller 46 (FIG. 11b), which is operable to control via the booster the total braking force developed with the power assist provided by the booster.

POWER BOOSTER

Referring to the schematic illustration of FIG. 10 and detailed in FIG. 11a, the power booster 42 is shown to be of the vacuum suspended type having a casing 122 and a diaphragm supported power wall 124 movably mounted in the casing and connected to the output rod 126 of the device which operates the master cylinder pistons 128, 130. A booster control valve means including a three-way control valve 134 is utilized in the power booster for modulating the pressure in the power chamber 136 behind the power wall 124, while the casing chamber 138 ahead of the power wall is connected through a passage 233 to the vacuum side of the controller 46 (FIG. 11b) and thence to a check valve (not shown) and to the intake manifold 44 of the automobile engine through a hose 140. The three-way control valve 134 is effective to modulate the pressure in the power chamber 136 behind the power wall upon actuation by an actuating rod 142 connected to the brake pedal linkage.

As previously noted, one of the principal features of this invention is control of the total braking force responsive to changes in deceleration of the vehicle reflecting impending wheel lock-up, through control of the power booster. In the form of system shown schematically in FIG. 10, this is achieved by control of the differential pressure across the movable power wall of the booster to modulate the output force produced by the booster and thus the braking forces at both front and rear wheels about that output force required to develop the maximum coefficient of friction between the tire and the road (see FIG. 8) to maintain substantially maximum vehicle deceleration for a given tire-road combination while preventing wheel lock-up and vehicle skidding.

A conventional type of vacuum suspended power booster is supplied with two sources of pressure, "vacuum" and "air"; the present vacuum suspended power booster 42 is constructed to utilize a differential pressure which is modulated by deceleration responsive means over a range, rather than the fixed differential pressure between vacuum obtained from the engine intake manifold and air at atmospheric pressure.

In the present booster, to receive a modulated air pressure from such deceleration responsive means 46 (herein shown as a controller 46) the power wall assembly 124 of the booster 42, as shown in FIG. 11a, is constructed with a sealed air chamber 146 formed between two spaced plates 148, 150, clamped to the inner rim of the supporting diaphragm 152. The air at modulated pressure is conducted to the air chamber 146 through an unrestricted flexible hose 154 carried inside the vacuum chamber 138 of the booster. When supplied from the controller 46, for example, the air is received from the output passage 156 of the controller 46 which is mounted on the vacuum chamber case 122. The air hose 154 is fixed at one end to a tubular elbow 160 welded to and projecting inside the vacuum chamber 138, while the other end of the flexible hose 154 is connected to a fitting 162 on the power wall 124.

Control of the differential pressure across the power wall of the booster in the range of braking forces up to the skid point is achieved by the three-way booster valve 134 which operates over this range in the conventional manner. The pressure in the air chamber 146 on the power wall is maintained at a small differential above the pressure in the power chamber 136 by the decelerometer portion of the controller 46, so that flow of air to the power chamber is provided by actuation of the booster control valve 134 to produce power booster output forces of a magnitude adequate to operate the brakes via the master cylinder actuation. Thus, the valve 134 includes a tubular rubber valve element 164 having a radially extending rubber disc 166 at one end reinforced by a rigid ring 168 and providing concentric air and vacuum valve seats 170, 172. The tubular rubber valve element 164 is supported at its other end, so as to provide for axial movement of the rubber disc, by a flexible skirt 174 which extends radially and is clamped at its outer edge to the power wall 124 in any suitable way. A fixed air valve seat 176 is formed at the inner circular edge of one of the power wall plates 150 and the disc 166 of the valve element is movable onto and off the fixed air valve seat 176 to control flow of air from the air chamber 146 on the power wall 124 to the power chamber 136 behind the power wall.

The vacuum valve of the three-way booster control valve is formed between the vacuum valve seat 172 on the movable disc 166 of the valve element and a cooperating seat 178 formed by the circular forward edge of a valve member 180 operably moved by the brake pedal. This valve member 180 is carried for sliding movement within a tubular rearward extension 182 of the power wall 124, which extension is fastened to the rear plate 150 forming the power wall. The power wall extension 192 slides within a rubber seal 184 on the axis of the booster casing and surrounding the opening in the casing rear wall 186 through which the extension projects. The valve member 180 is operated by the actuating rod 142 connected to the brake pedal linkage, and the valve member 180 extends forward through the open center of the rubber valve element 164 leaving an annular passage around the outside of the valve member which communicates with the vacuum chamber 138 on the forward side of the power wall 124. A power wall return spring 188 is included, and a light spring 190 to positively return the rubber valve element and thereby close the air valve is also included.

The three-way booster control valve 134 is shown in FIG. 11a with the rubber valve element 164 and other components in the fully returned position with the air valve closed and the vacuum valve open; it will be clear that upon application of the brake pedal, the actuating rod 142 will move the valve member 180 forward to engage the vacuum valve seat 172 on the movable rubber valve element thereby closing the vacuum valve — in this position of the assembly both the air and the vacuum valves are closed — this is commonly referred to as the lapped position of the three-way valve. Further actuation of the brake pedal moves the actuating rod 142 and valve member 180 forward carrying the rubber valve element 164 forward and lifting it off the fixed air valve seat 176, thereby opening the air valve and allowing air in the sealed chamber 146 on the power booster wall 124 to flow into the power chamber 136 behind the power wall. The increase in pressure in the power chamber behind the power wall produces a differential pressure across the power wall which causes the power wall to move forward in the casing, the three-way valve 134 having a self-lapping action which results in the air valve being closed upon forward movement of the power wall and the vacuum valve being maintained closed when the portion of the reaction to the output force developed by the unit transmitted back toward the brake pedal through a reaction mechanism 400 balances the force applied to the brake pedal by the operator. The reaction mechanism 400 may be of conventional construction as illustrated for example, in Bauman U.S. Pat. No. 3,033,173.

DECELERATION RESPONSIVE CONTROL

The controller for controlling the supply pressure to the power booster to control the operation of the booster to prevent wheel lock-up and vehicle skidding, and for controlling the power actuated proportioning device responsive to deceleration to provide maximum braking up to the skid point, will now be described. The controller 46, shown in FIG. 10, schematically and detailed in FIG. 11b, in general comprises a valve body 210 or housing having a central chamber-defining portion 211. Within the central portion 211 of the valve body there is provided a three-way valve indicated generally at 212, and a dumbell-shaped inertia-mass 213 for actuating the valve 212 to modulate the output pressure from the decelerometer portion of the controller which is the supply pressure to the booster, as a linear function of deceleration, as illustrated graphically in FIG. 9, which supply pressure is conveyed through the passage 156 to the booster 42. The booster is also supplied with vacuum through a vacuum passage 233 via the forward vacuum chamber 229 of the controlling check valve (not shown) and nipple to a vacuum source such as the intake manifold of the engine. Thus, control of the air supply pressure by the decelerometer 46 achieves the desired end of controlling the differential pressure utilized to operate the booster.

Within the central portion 211 of the decelerometer housing 210 are openings for connections to two sources of pressure, a port 215 connecting to atmosphere and a port 216 connecting to line 140 and thence to a source of vacuum. The port 215 is protected by a mesh filter 218 and a perforated screen 219 which serves to filter the atmospheric air as it passes through the port 215.

The inertia-mass 213 is comprised of a shaft member 220 having an enlarged end 221 to which another separate inertia member 222 is threadably secured, given the inertia-mass 213 a dumbbell shaped appearance. The inertia-mass 213 is supported for axial sliding movement in the housing 210. At its forward end (to the left as seen in the drawing) the inertia-mass 213 has a projection 213' of reduced cross-section slidably received in a TFE Teflon bushing 223, and at its rear end the inertia-mass 213 has a recess for a TFE Teflon bushing 225 which receives a protruding stub shaft 226 carried by a diaphragm housing 227 fastened to one end of the valve body 210. Teflon is used as the material for bushings 223, 225 because its coefficient of friction is low and becomes smaller as sliding speed approaches zero rather than larger as is true of other materials. The bushings 223, 225 thus enable freely slidable movement of the inertia-mass 213 in an axial direction within the housing 210 in response to deceleration forces, and inhibit any tendency of inertia-mass 213 to operate in a "stick-slip" manner and thus assist in producing smooth, sensitive operation of spool valve 212.

The chambers defined within the central chamber forming portion 211 of the housing include a first pressure chamber 228 open to atmospheric pressure through the port 215, a second pressure chamber 229 separated from the first pressure chamber 228 by a wall 230 and connected to the vacuum source through the port 216, and a third output pressure chamber 231 separated from the first pressure chamber 228 by a body wall 232. The second pressure chamber 229 is also connected to the vacuum chamber 138 of the power booster 42, through a vacuum passage 233 in the mounting bracket 120. Thus, both the controller vacuum chamber 229 and the booster vacuum chamber 138 are maintained at a sub-atmospheric pressure of about 5 p.s.i.a. by connection to the engine intake manifold 44 through a check valve and a vacuum hose 140 (FIG. 10 and FIG. 12) as compared to the about 14.7 p.s.i.a. available from the atmosphere at the port 215.

The differential between the pressure in the output chamber 231 of the decelerometer portion of the controller and the vacuum source is modulated by controlled opening of an air valve 236 and a vacuum valve 237 which are components of the three-way valve 212. The air and vacuum valves are arranged on a valve spool 238 which is coaxially and slidably received on the intertia-mass 213. Shaft 220 of inertia-mass 213 is sprayed with a light TFE Teflon coating to inhibit stick-slip action between inertia-mass 213 and spool valve 212, as described for bushings 223 and 225. The valve spool 238 has internal passages 239 connecting the air and vacuum valves 236, 237 which control or modulate the output pressure in chamber 231 as it relates to the vacuum pressure in chamber 229.

Both the air and vacuum valves 236, 237 comprise annular rings 236', 237' of resilient material inlaid into circular slots in the corresponding faces of the valve spool 238. The inlaid material forms a sealing ring which abuts against a corresponding annular boss 236", 237" which forms a seat. In the case of the vacuum valve 237, the seat 237" thus formed is on the forward-facing surface of section 222 of the inertia-mass 213, while the ring 236' of the air valve 236 seats against an annular boss 236" formed in the chamber wall 232 separating the first pressure chamber 228 and the output pressure chamber 231. The arrangement of the components forming the valves 236, 237 has the advantageous feature wherein both valves are operable to close against fluid flow and open with the flow. In other words, the valves are positively closed against fluid flow which tends to urge the valves to open rather than to close. Thus both valves have identical operating characteristics and open and close without stick-slip tendencies due to pressure differential across the valve.

While the valve spool 238 is slidably received on the inertia-mass 213, it is also connected to the body wall 230 by a flexible annular diaphragm 240. The diaphragm 240 is shown having a permanent semicircular set flexed in a rearward direction in response to the atmospheric pressure forces within the first (high) pressure chamber 228. The diaphragm 240 has a mean effective area at a diameter equal to the diameter of the valve rings 236' and 237' so that pressure within the chamber 238 is balanced and does not affect the operation of the valve. In addition, the flow area of valves 236 and 237 is identical so that valve operations on increasing and decreasing pressure differential changes are identical.

The inertia-mass 213 is slidably supported on Teflon bushings 223, 225 in body 210 and is also conencted to the rear portion of body 210 by a flexible annular diaphragm having an effective diameter less than that of diaphragm 240 and valves 236, 237. Passage 244 in body 210 connects the output pressure chamber 231 and the cavity 243 aft of diaphragm 245 containing bushing 225 and inertia weight support stub shaft 226. Thus cavity 243 is maintained at the same pressure as chamber 231.

The size and arrangement of valves 236, 237, diaphragms 240, 245, and passage 244 result in the provision of an annulus A of unbalanced pressure area across the inertia-mass 213 between chambers 231 and 229. Thus the force produced by acceleration of the inertia-mass 213 (F=MA) in the direction of the axis of the dumbell is balanced by the pressure difference between chambers 231 and 229 acting on the area A at which time both valves 236 and 237 will be closed (lap position). The use of diaphragm 245 in conjunction with valves 236, 237 and diaphragm 240 permits the selection of a large diameter for valves 236, 237 for high fluid flow capacity with small axial motion while keeping the differential pressure area A to a moderate value thus permitting the use of a moderate sized inertia-mass 213.

A very light (approximately 0.57 lb. initial force in the illustrative embodiment) lap spring 241 is provided between the inertia-mass 213 and the valve spool 238 to urge the valves 236 and 237 toward their closed position and prevent indecisive valve action. This spring creates a slight bias in favor of closing the vacuum valve on reduction of deceleration force and therefore its value must be kept small.

A bias spring 242 is provided between the inertia-mass 213 and the diaphragm housing 227. This spring and area A establish the value of the initial pressure differential (Point Z FIG. 9) between the supply chamber 231 and the vacuum chamber 229 at zero deceleration. The slope of the decelerometer characteristic curve Y is determined by the relationship between area A (FIG. 11b) and the weight of the inertia-mass 213. These values and the value of the bias spring are selected to provide a decelerometer characteristic curve Y (FIG. 9) which is parallel to and slightly above the booster characteristic curve X. Curve X describes the performance of the booster as installed in the vehicle. The difference between curve Y and curve X is the pressure available to cause fluid to flow into the booster when the booster valve is open and is called lead pressure. The lead pressure should be as nearly constant as possible in order that it can be made as small as possible over the operating range of the booster. This can best be accomplished by contouring the booster diaphragm to give it a straight line characteristic in the operating range as shown in FIG. 9. The break at the lower end of the booster characteristic curve where the booster is overcoming brake return springs etc. can be disregarded. The provision of a constant, but small lead pressure serves the purpose of controlling the sudden application of the brakes and thus inhibits "spiking". A second purpose will become apparent later under the description of skid control operation.

The use of TFE Teflon for bushings 223, 225 to support the inertia-mass 213 in the body 210 as well as the use of a TFE Teflon coating between the inertia-mass 213 and the spool valve 212 and the use of thin formed impregnated nylon diaphragms 240, 245 reduces friction losses to a negligible amount and permits the narrow hysteresis band for the decelerometer 46 shown in curve Y of FIG. 9. The hysteresis band for the booster 42 is shown in curve X.

In the condition of zero deceleration, the static condition of the unit, air in the air chamber 228 admitted past the air valve seat defined by the resilient ring 236' of the air valve 236, raises the pressure in the output chamber 231 relative to the pressure in the chamber 229. The magnitude of the differential pressure thus created is a function of the force of the bias spring 242 and the size of the resultant area A, when the spool valve 212 is in the lap position. It will be seen that the pressure in the output chamber, which is the supply air for the booster, will increase until the differential pressure acting on the resultant area A produces a force which is substantially equal to the opposing force exerted by the spring 242. This sets the magnitude of the initial differential pressure.

In the dynamic condition, acceleration of the inertia-mass 213 produces a force proportional to deceleration (F=ma) which tends to move the inertia-mass 213 forward (to the left in FIG. 1), so as to open the air valve 236 while the vacuum valve 237 is maintained closed, as shown in FIG. 14B. This deceleration produced force is opposed by a pressure produced force, due to the differential in pressure between the low pressure chamber 229 and the modulated pressure chamber 231 acting on the resultant effective area of the annulus A of the inertia-mass 213. The force produced by deceleration of the inertia-mass 213 plus the force of the bias spring 242 acts to move the inertia-mass 213 forward in the valve housing 210 to open the air valve 236 and thereby increase the output or supply pressure from the controller. It is an important feature of the invention that the total movement of the inertia-mass to open the air valve 236 is extremely minute, on the order of thirty to forty thousandths of an inch in either direction from lap position in a physical embodiment of the invention. The air and vacuum valves at their seats have a relatively large diameter (illustratively 1.52 inches), and the valves have proportionally large internal passages as shown, however, so as to allow high rates of air flow through the supply passage 156 sufficient even at such small valve openings to operate the power booster 42. Assuming a constant rate of deceleration, air admitted past the valve 236 will increase the supply pressure until the pressure differential between the chamber 231 and the vacuum chamber 229 acting against the area of the annulus A balances the force due to that rate of deceleration acting on the inertia-mass 213 and moves the inertia-mass rearward to close the air valve 236 while the vacuum valve 237 remains closed, as shown in FIGS. 11b and 14a. The vacuum valve will remain in this steady-state lapped condition so long as uniform deceleration is maintained, resulting in a constant supply pressure differential which is a measure of deceleration as shown in the graph, FIG. 9. When deceleration lowers or ceases, the inertia force is unbalanced by the pressure force, causing the vacuum valve 237 to be opened as shown in FIG. 14c while the air valve 236 is maintained closed by the lap spring until the pressure corresponding to the new deceleration, or the predetermined initial differential pressure is again achieved.

During the periods in which deceleration is increasing, air valve 236 will be opened by the inertia mass 213 to produce an increase in the fluid pressure in the modulated pressure chamber 231. As the fluid pressure in chamber 231 increases, fluid flows through passage 244 from chamber 231 to cavity 243 to provide the pressure in the cavity 243 aft of diaphragm 245 equal to that in chamber 231. Since a pressure differential is required to produce fluid flow, the pressure in cavity 243 will lag that in chamber 231 by a finite, although small, amount of time. During this period of time, the fluid pressure in cavity 243 will be lower than the fluid pressure in chamber 231. The magnitude of the pressure differential between chamber 231 and cavity 243 is a non-linear function of the rate of change of pressure in chamber 231. In addition, assuming a given size of cavity 243, the pressure differential corresponding to a given rate of change of pressure in chamber 231 is dependent on the size of and thus the restriction to flow of fluid in passage 244. This pressure differential between chamber 231 and cavity 243 acting on the circular area inside of annulus A, produces a force over and above that produced by annulus A tending to close air valve 236. It may be noted that for any given value of pressures in chambers 215 and 231, the rate of change of pressure in chamber 231 is determined by the amount of opening air valve 236.

In the same manner, vacuum valve 237, modulated pressure chamber 231, passage 244 and cavity 243 interact to produce a force over and above that produced by annulus A tending to close vacuum valve 237 during the periods in which deceleration is decreasing.

The stiffness characteristic of a balanced valve can be defined as the relationship between the instantaneous force tending to close the valve and the corresponding amount of valve opening. If the restriction to fluid flow of passage 244 is substantially zero, where the passage is very large, the stiffness characteristic will be a straight line as shown in curve a of FIG. 17. However, when the restriction to fluid flow of passage 244 has finite values, as with the construction shown, the stiffness characteristic takes the form of curves b or c depending on the relative size of passage 244.

It is thus a feature of this invention that the balanced valve has damping which is both controllable and nearly frictionless. Frictionless damping permits high sensitivity, rapid response and low hysteresis without pressure overshoot and pulsation characteristic of undamped valves because the force tending to return the valve to the lapped position is low for small valve displacements and becomes higher than a direct proportion as the valve displacement increases to high values. It should be noted that damping by means of friction devices as is commonly used to prevent pressure overshoot and pulsation reduces sensitivity and increases response time and hysteresis to a marked degree.

An energy absorbing cushion 225 of yieldable material is located on the forward section 207 of the valve body 210 for engagement by the end of the projection 213' to dampen the shock of engagement between the inertia-mass and the valve body 210. A similar cushion 225' at the opposite end of the inertia-mass 213 is also included for energy damping purposes.

OPERATION FOR MAXIMUM DECELERATION WITHOUT SKIDDING

How the variable proportioning device, the controller 46 and the power booster function together so as to maintain maximum vehicle deceleration without skidding will be better understood from an analysis of operation of the system and a consideration of the X and Y curves on FIG. 9. Referring to FIG. 9, it includes a booster performance curve X which depicts a substantially linear relationship between deceleration and the differential pressure between the pressure in the power chamber 136, behind the power wall and the vacuum pressure in chamber 138 in front of the power wall. The dual lines forming the curve X illustrate a hysteresis band for the booster 42, and the separate lines for the curve Y illustrate the desirably narrower hysteresis band for the decelerometer portion of the controller 46.

In the development of this curve X, it is assumed that the stopping force supplied at the road surface to the tires (and hence deceleration of the vehicle) is substantially proportional to the output force from the booster over the operable range where wheel skidding may be experienced. This is substantially true for most conventional boosters.

With this assumption, it will be seen the typical performance curve X (which is linear) of the decelerometer section of the controller 46, is parallel to and uniformly spaced from the typical performance curve Y of the booster over the range of operation of the units.

Curve Y, furthermore, is shown above curve X, illustrating that the modulated air supply pressure from the decelerometer which is conveyed to the supply chamber 146 in the power wall of the booster, is maintained uniformly higher than the pressure in the power chamber of the booster throughout the range of operation where wheel skidding may be experienced; that is, there is a substantially constant lead pressure. Establishing, maintaining and minimizing this lead in the modulated air pressure supplied by the deceleration responsive means over this range has been found an important requisite for satisfactory operation of the system in controlling wheel skidding.

Thus, the curves X and Y should be separated substantially uniformly over the skid range and should not intersect, taking into consideration the hysteresis band of both curves. The separation between the curves should, furthermore, be sufficient to permit normal operation of the booster upon actuation of the brake pedal and resultant actuation of the booster control valve in the range of operation of the booster up to the point of maximum required braking forces. As an illustration, the curves X, Y of FIG. 9 are shown uniformly separated by approximately 1.0 to 1.5 p.s.i. which has been found ample to permit normal operation of a small car booster, for example, for a Ford Mustang.

Moreover, the uniform separation of the X and Y curves should be maintained at a minimum value, which, while sufficient to permit such normal operation of the booster, is held as small as possible so that the sudden reduction in supply pressure to the booster when the deceleration responsive means detects sudden reduction of deceleration due to impending wheel lock-up becomes immediately effective to reduce booster force output and thus reduce the force provided to the brakes of the vehicle.

In the inactive condition of the braking system, the initial decelerometer supply pressure (approximately 7 p.s.i.a.) is maintained in the sealed air chamber 146 of the booster 42 by the controller 46. When the brake pedal 40 is applied to actuate the power booster, air at the decelerometer supply pressure is, therefore available in the sealed chamber 146 of the power booster, and when the booster control vacuum valve is closed and the air valve is opened responsive to movement of the brake pedal, air will be admitted from the sealed chamber 146 to the power chamber 136 behind the power wall 124, causing the power wall to move and operate the master cylinder pistons 128, 130. These pistons upon forward movement develop hydraulic pressure in the brake lines which will apply the front and rear brakes causing the vehicle to begin to decelerate.

Deceleration of the vehicle will be reflected in a higher supply pressure in the output chamber 231 of the controller 46, as shown in FIG. 9; the controller, in effect, increases the pressure in the air chamber 146 in the booster power wall and air at a higher pressure is, therefore, available to further increase the output force developed by the booster 42 when further manual force is applied to the brake pedal by the operator. The controller is preferably constructed with a sensitivity to respond to the initial deceleration by increasing the supply pressure as a linear function thereof as shown in FIG. 9, and with a precision to maintain a supply pressure which leads the curve X of air pressrue in the power chamber 136 throughout the range of operation of the control means up the performance curve to the skid point. By maintaining a predetermined differential pressure between the pressure in the air chamber 146 within the power wall and the power chamber 136 behind the power wall throughout the range of operation up to the skid point, manual operation of the 3-way valve in the booster by the operator in the direction of increased force on the brake pedal 40 will always result in increased output force being applied to the master cylinder and therefore to the braking system. The relatively small pressure differential has the effect of supplying air to the power chamber at a controlled rate that inhibits spiking or excessively fast and hard braking forces resulting from fast movement of the power wall assembly during a "panic stop" typically resulting in wheel skidding.

Since the ratio of the braking forces applied to the front and rear wheels will be continuously changed by the variable proportioning device as deceleration increases, the maximum stopping forces will be achieved at both the front and rear wheels, producing maximum deceleration before the wheels tend to lock-up simultaneously at a point when the braking force applied to the wheels as a result of increased pressures from the booster operated master cylinders causes the slip ratio (See FIG. 8) to exceed the peak value of coefficient of friction achievable under given tire-road conditions. The wheels start to break free of the road surface simultaneously which will be reflected in a sudden reduction in vehicle deceleration.

The sudden change in vehicle deceleration accompanying the increase in slip ratio is detected by the controller 46 which operates to reduce the output pressure in chamber 231 of the decelerometer section and thus the supply pressure to the booster and eliminates the positive differential pressure between the air supply chamber and the power chamber within the booster and produces a negative differential pressure therebetween. This results in withdrawing air from the power chamber 136 of the booster reducing the pressure in that chamber and reducing the pressure differential across the booster power wall 148 to reduce the braking force applied by the braking system, even though the operator continues to apply the braking pedal. The mechanical advantage of the power booster power wall 148 relative to the braking pedal 40 and mechanical linkage is such that reduction of this differential pressure will momentarily release or reduce the output force of the booster notwithstanding the operator applying force to the pedal.

Further in accordance wth the present invention, the controller 46 has an enhanced response to such sudden decreases in deceleration, so that the controller will substantially decrease the pressure in the supply chamber 231 in a very short time interval, ideally less than one tenth second and maintain this reduced pressure for a short time interval, (a few tenths of a second depending on the rate of response of the entire braking system). This reduced supply pressure is conveyed to the booster power chamber 136 and causes the power booster power wall 124 to return and reduce the total braking force.

The enhanced response to sudden decreases in deceleration is accomplished by providing an augmentor section in the controller 46. This section (FIG. 11b) embodies an independently movable diaphragm assembly 246 mounted adjacent the forward end of the inertia-mass 213 and operable in response to sudden decreases in deceleration. The diaphragm assembly 246 separates the output chamber 231 from a control chamber 248 which is supplied with power chamber 136 pressure of the booster through a conduit 250 (FIG. 10) and a one-way ball check valve 252 (FIG. 11b). A restricted orifice 254 bypasses the check valve 252 and allows a restricted flow in the reverse direction. Since the control chamber 248 is normally maintained at a lower pressure than the output chamber 231 of the controller via the conduit 250, forward movement of the interia-mass 213 responsive to gradual changes in deceleration is not impeded by the augmentor diaphragm 246.

Alternatively, the control chamber 248 may be supplied with pressure from the output chamber 231 of the controller by a line 250' (FIG. 10), in which case a spring 250" is provided of sufficient strength to replace the force holding the augmentor diaphragm 246 in the forward (left in FIG. 11b) position resulting from the lead pressure differential between the output chamber 231 and the booster power chamber 136.

In the event of sudden decreases in deceleration reflecting impending wheel lock-up, however, the one-way check valve 252 traps the prevailing power chamber pressure in the control chamber 248 while the pressure in the output chamber 231 is decreased by the movement of the inertia-mass to the right to open the vacuum valve 237. Opening of the decelerometer valve 237 is thereby augmented since the diaphragm assembly 246 is moved by the differential pressure between the trapped pressure in the control chamber 248 and the decreasing supply pressure in the output chamber 231, and slides toward the right in FIG. 11b bringing the center stub shaft 253 of the diaphragm assembly into engagement with the end of the projection 213' on the inertia-mass and thrusting the inertia-mass 213 rearward in the direction tending to further open the vacuum valve 237. Thus, sudden decreases in vehicle deceleration due to impending wheel lock-up result in rearward movement of the inertia-mass which is augmented by the force produced by the diaphragm assembly 246 and causes the vacuum valve 237 to be opened. The orifice 254 in addition to controlling the duration of this augmented opening of the decelerometer valve 237 permits the pressure in the control chamber 248 to follow the pressure in the booster power chamber 136 with sufficient rapidity to prevent rearward motion of diaphragm 246 when deceleration is reduced by manual release of the brake pedal 40.

The duration of the regenerative effect is controlled by the size of the restricted orifice 254 together with the size of the control chamber 248; after a predetermined interval determined by the size of the orifice and chamber, the trapped pressure in the control chamber 248 leaks past the ball valve 252 through the orifice 254 thus eliminating the differential pressure of the control chamber and bringing the pressure therein into equilibrium with the pressure in the booster power chamber 136 and returning the augmentor diaphragm 246 to its forward (to the left in FIG. 11b) position.

The controller 46 at this point has resumed its normal operating condition. If the manual control pedal 40 is still being applied, the vehicle braking system will be reapplied in the manner previously described and the cycle is repeated until the vehicle is brought to a stop or the brake pedal 40 is released.

It will be noted that two diaphragms 247, 247' make up the diaphragm assembly 246 with a common chamber 256 between them connected to the exhaust chamber 233 through a passage 257; this arrangement eliminates pressure reversals across the flexible member of the diaphragm and thereby provides advantages such as low friction and long diaphragm wear. It will be observed, however, that the operative pressures across the diaphragm assembly are the pressures in the output chamber 231 and in the control chamber 248.

An important feature of this augmented pressure release arrangement is the provision of the one-way check valve 252 which is normally operable to provide free passage and admit the prevailing pressure in the power chamber of the booster to the control chamber 248, and which is effective when deceleration suddenly reduces or decreases tending to return the inertia-mass 213 and valve means to the right to trap the prevailing pressure within the control chamber 248 and thereby accelerate the motion of the mass and valve means toward the right to open the vacuum valve 237 and in conjunction with orifice 254 to hold the vacuum valve open for a controllable period of time. The check valve or one-way relief valve 252 is large in diameter and is retained by a light spring 258 and a threaded receptacle 260 against a seat 262. A drilled passage 264 connects the flow from the one-way check valve to the control chamber 248. By this means the controller is enabled to respond rapidly to sudden reduction in deceleration at any level of deceleration to inhibit wheel lock-up while maintaining close control during normally changing deceleration conditions to provide improved booster operation.

When a condition of sudden decreasing deceleration occurs, the performance of the decelerometer section of the controller 46 is modified momentarily by the augmentation section. Referring to FIG. 16, curve D represents a typical plot of deceleration over a period of time, while curve P represents the differential pressure across the power wall of the booster for the corresponding deceleration condition. As the curves show, deceleration leads the differential pressure by a very small amount during normal brake application. However, when deceleration suddenly decreases, reflecting an impending skid, the augmentation device goes into action and causes the decelerometer to decrease the differential pressure ideally at a much faster rate. The augmentation effect begins as the inertia-mass 213 moves rearward, closing the air valve 236 and opening the vacuum valve 237. Without the augmentation effect the movement of the inertia-mass 213 rearward would tend to cease at the lap position due to the build up of a negative pressure differential on the annulus A tending to force the mass forward. However, the one-way valve 252 traps the previously high supply pressure in the chamber 248 at the forward end of the valve, and the pressure differential created across the diaphragm assembly 246 results in a reverse force (to the right in FIG. 11b) produced by the assembly 246 acting against the inertia-mass. This rearward movment of the inertia-mass holds the vacuum valve 237 open to allow the supply pressure in the chamber 231 to decrease rapidly, further increasing the differential pressure across the assembly 246 and the augmentation force created thereby until the control chamber 248 and supply chamber 231 approach equal pressures. The restricted orifice 254 allows the pressures in the chambers 248 and 231 to equalize, removing the augmentation force and returning the entire valve to its original condition in readiness for response to further deceleration.

The duration of the regenerative effect after the start of wheel lock-up is controlled by the timing orifice 254 of the augmentation section of the controller 46 to reduce the total braking force for a period sufficient to restore the tires in rolling contact with the road surface and to a slip ratio relative thereto (see FIG. 8) to the left of and below the peak of the coefficient of friction curve, as diagrammatically illustrated by the curved arrows Z. The sudden decrease in supply pressure from the controller is conveyed to the sealed chamber 146 on the power wall 124 of the booster through the unrestricted air hose 154. This chamber in turn communicates through the passage of the booster control valve 134 between the air valve seats 170, 176 to the power chamber 136 of the booster. The objective is to reduce the pressure in the power chamber 136 as rapidly as possible so that the power chamber pressure curve follows the supply pressure curve from the decelerometer. To supplement the flow through the air valve passage in the event the three-way control valve is in lapped position or otherwise restricted, the booster control valve means also includes a bypass one-way valve 270 that is provided on the power wall 124 connecting the power chamber 136 to the sealed chamber 146 on the wall. Upon reduction in the pressure in the sealed chamber 146 due to a sudden reduction in the supply pressure from the controller 46, the air in the power chamber 136 is returned through the air valve passage supplemented by flow through the one-way check valve 270 and exhausted through the hose 154 to the controller, in effect flowing in reverse direction through the supply passage. A reduction in the power chamber pressure causes the power booster wall 124 to return (move to the right in FIG. 11) under the force of the hydraulic pressure in the brake lines and master cylinder means, and the return spring 188, which overcomes the reduced pressure differential across the power wall. It is seen that the booster control valve means includes both the three-way control valve 134 and the one-way valve 270 which is operable to bypass the three-way control valve for air flow in the reverse direction. It is also preferable that the cross-sectional area of the valve means approximately matches the cross-sectional area of the air hose 154 to allow substantially unimpeded air flow in the reverse direction when both valve components of the valve means are open.

Referring again to FIG. 8, after rolling contact is reestablished between the tire and road as indicated by the arrows Z, and assuming that the brake pedal 40 is still applied as in a hard braking stop, increased deceleration causes the controller 46 to raise the air supply pressure to the booster 42 which will raise the differential pressure across the power wall 124 and cause it to move forward in the casing to increase the braking force. This cycle of increasing and decreasing braking force, or pulsing of the braking force about the skid point as represented ideally by the arrows Z, should occur at intervals of less than a second and preferably at a rate up to about six cycles per second. The ability to obtain desirably high pulsing frequency is limited by the rate of response of the components of the entire brake system including the controller and the booster, but theoretically any desired pulsing frequency can be obtained with this system by providing adequate size air flow passages and components with frequency response characteristics higher than the desired pulsing frequency.

As also indicated in FIG. 8, the cycling of braking force about the skid point will occur at all conditions of tire-road coefficient of friction, since the decelerometer section of the controller 46 maintains the booster supply pressure at a substantially constant lead differential pressure over the pressure required by the booster to produce the corresponding deceleration. Thus, the augmented response of the controller 46 is substantially constant at any rate of deceleration. In addition, the proportioning device functions to vary the ratio of front to rear stopping force as a function of deceleration, and with both the proportioning device and deceleration controlled booster effective in the system maximum vehicle deceleration will be achieved at the maximum coefficient of friction that can be developed under a given tire-road condition. It is also to be noted that one of the important features of the system, is the ability to adjust the proportioning device for various conditions of loading the vehicle, which affects the total weight of the vehicle and its center of gravity, to achieve the ideal $S_f/S_r$ curve. Accurately matching of the proportioning device to the vehicle load will produce optimum results in terms of maximum stopping force and maximum stopping distance under all road conditions.

To adjust the proportioning device, referring to FIGS. 10, 11c and 12, a cable 280 operated by the manually adjustable handle 282 is connected to the cap 101 on the lower portion of the housing of the proportioning device (FIG. 11c). The cap 101 has helical slots 286 in the side wall which receives the ends of the cross pin 100 around which the spring 95 of the proportioning device is anchored. The cap 101 with its helical slots operates like a cam upon rotation of the cap to advance or return the cross-pin 100 and thus adjust the tension on the spring 95. To rotate the cap 101, the cable 280 is fastened to an arm 288 which extends from the cap as shown in FIG. 12. The handle 282 is adjustable in either direction from its mid design curve position for light or heavy loads, which will rotate the cap in either direction from its design curve position established by the locking ring 290 against which the forward end of the cap 101 abuts. A set screw 292 is provided to lock the ring 290 after obtaining the design curve pressures from the proportioning device with the cap 101 in its said position.

By adjustment of the proportioning device any one of a family of $S_f/S_r$ curves can be obtained, according to the loading of a particular vehicle, as indicated by FIG. 2.

A further aspect of the present invention involves a mechanism for effectively shutting off the inertia response function of the controller 46 when the vehicle is moving bickwards and the forces due to deceleration act in a reverse manner to those normally imposed on the inertia-mass thus producing a reduction in booster supply pressure as deceleration (in the reverse direction) is increased. If the controller 46 is operative when the vehicle is decelerating while moving backwards or when the vehicle is held motionless while headed upward on an incline, inertia forces will be created tending to move the inertia-mass 213 rearward (to the right FIG. 11b). Thus, if the decelerometer section of the controller 46 was operative under these conditions, the inertia forces would be effective to close the inlet air valve 236 and open the vacuum valve 237 thereby reducing the output pressure which is the supply pressure to the booster 42. Manual effort alone on pedal 40 would then be required to decelerate the vehicle when moving backwards, or to hold it motionless on an upward incline, and the booster assisting force would not be available to produce full booster assist. To overcome this problem, and provide full booster assist under these and other like conditions, an On-Off control mechanism including a diaphragm 320 is provided to immobilize the inertia-mass in a position which provides full fluid pressure in the booster power wall chamber 136 when the brake pedal 40 is applied. The On-Off control mechanism is also operable to immobilize the inertia-mass in a position to provide full air pressure in the power booster power wall chamber when the vehicle is moving forwardly and the brakes are not applied. This immobilization prevents operation of the decelerometer section to vary booster supply pressure that would otherwise occur responsive to normal changes in deceleration or acceleration while driving when the brakes were not applied. Such response is necessary only when the brakes are applied when the vehicle is moving forwardly. This latter mode of immobilization is not required for normal operation of the skid control brake system, but is shown here as a preferred feature.

Referring to FIGS. 10, 11a, 11b and 15, the On-Off control diaphragm 320 (FIG. 11b) in the controller 46 immobilizes the inertia-mass 213 by moving it to the left as shown, to keep the air valve 236 open and provide a supply of air at full atmospheric pressure in the air chamber 146 for operation of the booster. The On-Off diaphragm 320 is attached to a movable shaft 321 which has a head 322 that is adapted to contact the inertia-mass 213 upon movement to the left of the diaphragm and shaft assembly from the position shown in FIG. 11b. A spring 323 normally moves the head 322 to the left, opening the air valve 236 in the absence of forces applied to the diaphragm 320.

To actuate the diaphragm 320, two 3-way valves 326, 327 (FIGS. 11a, 15) are connected to On-Off control chambers 328, 329 which are separated by the diaphragm 320. The valve 327 is located adjacent the brake pedal linkage in the illustrative example as shown in FIG. 11a, and is operated when the brake pedal is applied, and valve 326 is located adjacent the rear propeller shaft transmission housing at the speedometer drive gear in the illustrative example as shown in FIG. 15, and is operated when the vehicle is moving in the reverse direction. The valves 326, 327 are connected to the On-Off control chambers 328, 329 through suitable conduits to apply pressures to the diaphragm 320 as will hereinafter be described.

The valves 326, 327 are similar in construction, with valve 326 having a housing 330 provided with an air chamber 331, a passage 331' communicating to outside air pressure, and a vacuum chamber 332 communicating through a passage 334, conduit 334' (FIG. 10) and passage 334" (in the controller, FIG. 11b and FIG. 12) to a source of vacuum herein shown as the vacuum chamber 138 of the power booster. The valve 326 has a valve element in the form of a tubular rubber grommet 335 having a movable valve flange 336 and a supporting flange 337 clamped at its outer periphery in the valve housing.

The valve 326 located at the propeller shaft is shown in its normal position when the vehicle is stopped or moving forward and in this state, the air and vacuum chambers 331, 332 are separated by the supporting flange 337 of the grommet element, and the valve flange 336 is seated on an annular seat 338 formed by the housing. In this "normal" state of the valve, air is conveyed from the passage 332 through the tubular center of the grommet element 335 past the end of an actuating rod 340 which has an annular end 341 adapted to contact the valve flange 336 to move it off its seat. Air is conveyed from the air chamber 331 through passage 342 to the On-Off chamber 328 (FIG. 11b) of the controller by means of a conduit 342' and an internal controller passage 342" (FIGS. 10 11b).

An actuating mechanism 345 is provided to move the rod 340 when the vehicle is moving backwards, so as to convey vacuum pressure to chamber On-Off chambers 328 of the controller instead of air pressure, herein shown as the pinion gear 346 which is conventionally provided on the end of the speedometer cable 347. This gear 346 is usually plastic and is slidably mounted on the end of the cable so that it can move axially but is fixed against relative rotation with respect to the cable. The pinion gear 346 is in mesh with a worm gear 348 on the propeller shaft. In the present case the axial movement of the pinion gear 346 to the right of FIG. 15 that occurs when it is driven by the reverse movement of the worm gear 348 when the vehicle is traveling backward is utilized to move the actuating rod 340 so that it lifts the valve flange 336 of the grommet element 335 off its fixed seat, closing communication between the air chamber 331 and the passage 342 and opening communication between the passage 342 and the vacuum chamber 333. Counterclockwise rotation of the worm gear 348 upon forward movement of the vehicle moves the gear 346 to the left which allows the actuating rod 340 to move to the left and returns the valve to the position shown in FIG. 15.

The three-way valve 327 (FIG. 11a) located at the brake pedal linkage is similar in construction to the valve 326, having an air chamber 350 communicating to atmosphere through passage 351 and the vacuum chamber 352 communicating through passage 353, conduit 353' (FIG. 10) and passage 334" to the booster vacuum chamber 138 here utilized as a vacuum source. An actuating rod 356 has an annular end 357 adapted to contact a valve flange 358 of a grommet element 359. Thus, it is seen that the air chamber 350 is normally isolated from the vacuum chamber 352 and communicates with a passage 360 which is connected to the On-Off control chamber 329 by way of a conduit 360' and a passage 360" (FIGS. 10, 11b). In this position air is supplied through valve 327 and line 360' to chamber 329 of the controller.

The three-way valve 327 is secured to the brake pedal arm 361 and therefore moves with the arm when the brakes are applied. A yoke 362 having an annular opening 363 is attached to the booster operating rod 142 and is coupled to the pedal arm 361 by a cross pin 364 secured to the arm. A spring (not shown) maintains the pedal arm in the position as shown in FIG. 11a when the pedal arm is not depressed. It is noted that the cross-sectional area of the cross pin 364 is smaller than the yoke opening 363 such that there is clearance between the pin and the edge of the opening. Thus when the pedal arm is pushed forward initially, the valve 327 carried on the arm moves forward, and the end 368 of the actuating rod 356 of the valve 327 contacts the back edge of the yoke 362.

Thus, depressing the pedal arm 361 will also actuate the valve 327, by moving the actuating rod 356 to the right against the force of the spring 369 relative to the valve housing before the cross pin 364 engages the yoke 362 in the forward direction. This communicates the vacuum chamber 352 with the passage 360 while isolating the air chamber 350 to convey vacuum to the control diaphragm 320. The valve 327 is located where the stop light switch is conventionally mounted; therefore, the actuating rod 356 may also have a central extension 370 that is connected to operate a conventional stop light switch 371 now shown carried on the valve housing.

To summarize the various modes of operation of the On-Off control diaphragm 320, when the vehicle is traveling backwards, the valve 326 at the speedometer take-off transmits vacuum pressure through the line 342' to the chamber 328. Thus the left side of the diaphragm 320 is at vacuum pressure and the right side is at air pressure producing a force assisting the spring 323 to move the inertia-mass 213 to the left and open the air valve 236 of the controller. When the brakes of the vehicle are applied while traveling in the backward direction the valve 327 located at the brake linkage will communicate vacuum through the line 360' to the right side On-Off chamber 329 of the controller and the diaphragm will be in a "vacuum suspended" mode. The spring 323 will have no diaphragm forces opposing it and will continue to move the inertia-mass 213 to the left thus opening the air valve 236 to supply full atmospheric pressure to the booster.

When the vehicle is stationary on an upward incline with the brakes applied, the left side of the On-Off control diaphragm 320 will be at air pressure, and the right side will be at vacuum. If the vehicle starts to roll backwards, the valve 326 at the speedometer take-off will be actuated to connect vacuum pressure to the left side On-Off chamber 328 via the line 342' enabling the spring 323 to again move the inertia-mass to the left in FIG. 11b and open the air valve and connect full atmospheric air supply pressure to the booster.

It will, of course, be observed that the On-Off control does not interfere with the operation of the controller when the vehicle is traveling forward and the brakes are applied. Thus, when the vehicle is traveling forward without the brakes being applied, both On-Off control chambers 328 and 329 are at air pressure and the diaphragm 320 will be in an "air-suspended" mode and the controller is immobilized. Application of the brakes actuates the valve 327 to connect vacuum pressure to the right On-Off chamber 329 while the left chamber 328 is sustained at air pressure. The force on the diaphragm thus overcomes the force of the spring 323, moves the shaft 321 to the right and clear of the inertia-mass so that it is freed for movement responsive to deceleration forces.

POWER BOOSTER CONTROLLED VARIABLE PROPORTIONING DEVICE

Referring to FIG. 10, the variable proportioning device 48 has a conduit 430 connecting the diaphragm assembly inlet port 82 to the decelerometer section of the controller 46 output as shown. However, the device 48 may alternatively have the booster power chamber pressure connected to the inlet port 82 by a conduit 431 as is also shown. From the foregoing description of the controller and power booster it will be clear that the power booster power chamber pressure is proportional to the output pressure of the controller. Because the controller output pressure is proportional to deceleration of the vehicle, when the brakes are applied and these components are operating below the skid point of the curve in FIG. 8, the power chamber pressure is proportional to deceleration and may be used via the line 431 to supply the power to the device 48 for performing the variable proportioning.

Additionally, with the proportioning device controlled directly from either the booster or the controller, other safety advantages result, in that the proportioning occurs at a very fast rate. As the vehicle approaches an impending skid condition during braking, the controller acts to reduce the booster output and therefore the braking forces. The reduction in controller output pressure and booster power chamber pressure substantially concurrently reduces the pressure operating the diaphragms 85, 86 within the proportioning device which substantially concurrently lowers the ratio of front to rear brake line pressures. Thus, the ratio is adjusted to conform to the road conditions in a very short time, which may also aid in avoiding a skid codition.

Moreover, the proportioning device 48 may be connected to the power booster in this manner even if a deceleration responsive means is not included in the system. The power chamber pressure, even when not supplied by such a means, has a varying pressure that has a known relationship to braking forces applied by the system and therefore would have a known relationship to deceleration, whether it be linear or non-linear. The cam surface 96 may be varied to compensate for this known relationship to result in the correct ratio of front to rear braking pressures for any tire-road coefficient of friction. A braking system without a controller with its decelerometer would not be an anti-skid braking system but it would have all of the advantages of the concept of variable proportioning to yield maximum braking for the vehicle up to the skid point. One of the advantages resulting from operating the device 48 by the booster, whether or not a deceleration responsive controller is present within the system, is that the power required to operate the proportioning mechanism is supplied by the self-contained diaphragm assembly and is not taken from the brake line. In other words, the full power output of the booster is utilized to operate the brakes without diverting fluid or power to the proportioning function.

While the invention has been described hereinabove in connection with an automotive power brake system utilizing a power booster, it will be appreciated that it is applicable to other types of power brake systems, such as central power hydraulic systems and air intake systems for vehicles such as buses and trucks, as well as automobiles.

Referring to the schematic illustration of FIG. 10, it is seen that the booster 42, the controller 46, the proportioning device 48 and the booster casing 38 are structurally interconnected to form a single unit. The four components form a skid control system that is designed to be preassembled and subsequently placed in a vehicle. Therefore, the components may be assembled into a unit and tested for fluid leakage as well as performance prior to placement in a vehicle. This may be a production advantage that is not found with some anti-skid braking systems currently being marketed that have components separately mounted at various points throughout the vehicle. Also, very little modification of the remainder of a vehicles braking system is necessary, which may facilitate relatively easy installation either as new equipment or as an addition for vehicles having conventional braking systems.

SKID WARNING CHARACTERISTICS OF THE SYSTEM

In the previously described operation of a booster in the braking system specifically disclosed herein, as the deceleration responsive means operates to modulate the differential pressure across the power wall of the booster to achieve skid control, force is applied to the power wall in the return direction by the fluid pressures in the master cyliner and brake lines, and by the return spring increasing by a factor of two or more the manual force required by the operator to maintain the brake pedal in its position when skid control operation is initiated. The operator feels this opposing force which tends to lift the brake pedal against his foot as he continues to apply the brake pedal to bring the vehicle to a stop. Thus the operator has a positive and apparent warning that he has exceeded the maximum tire-road adhesion capabilities of the vehicle.

Among the features of the invention which would be significant in connection with modifications of this type of power brake systems is the operation of the skid controller with its deceleration responsive means to produce a force opposing the manual force supplied to operate the brake system as the breaking force is modulated by the skid control means. This opposing force, in effect, overrides the manual force which may continue to be applied by the operator, so that the operator cannot override the skid control operation.

I claim as my invention:

1. A deceleration responsive control means comprising a housing having an output port and a pair of inlet ports, and a balanced valve including movable valve elements in said housing, said movable valve elements and housing providing cooperating valve faces and seats providing two flow control means for controlling the pressure in said output port by selective communication with two sources of fluid at differing pressures connected to said inlet ports, one of said valve elements comprising an inertia member movable in response to deceleration forces acting on said inertia member and operably connected to move the other element and operate said flow control means to vary the pressure in said output port as a substantially linear function of deceleration or acceleration forces, a sealing element sealably connected between said housing and said other valve element and having an area substantially equal to one of said flow control means, a sealing element sealably connected between said housing and said inertia member adjacent a dead ended cavity provided between said housing and said inertia member and having an area less than the other said flow control means, and a communicating damping passage between said output port and said cavity, the differential between the output port pressure and the cavity pressure due to flow resistance of said passage providing the balanced valve with a non-linear stiffness characteristic.

2. A deceleration responsive control means comprising the combination of a three-way valve and means responsive to deceleration for actuating said three-way valve to produce a modulated output pressure by controlling flow selectively from two sources of fluid at differing pressures, said control means including:
a housing, a valve spool movably mounted in said housing, a valve element comprising a movable inertia responsive member connected to said valve spool and producing forces proportional to deceleration of said member, said valve spool, housing and member providing cooperating valve faces and seats defining two flow control means,
and means responsive to output pressure connected to both said valve spool and said movable member and producing forces counteracting said deceleration forces so that said member moves said valve spool and controls flow by both said flow control means to produce a modulated output pressure which varies as a substantially linear function of deceleration.

3. A deceleration responsive control means comprising three-way valve and means responsive to deceleration for actuating said three-way valve to produce a modulated output pressure by controlling flow selectively from two sources of fluid at differing pressures, said control means including:
a housing, a valve spool movably mounted in said housing and having aligned, resilient, substantially equal diameter valve rings,
said housing presenting an annular valve seat for engagement by one of said valve rings providing a first flow control means,
a member movably mounted in said housing connected to said valve spool and producing forces proportional to deceleration of said member and presenting an annular valve seat for engagement by the other of said valve rings providing a second flow control means,
a spring between said member and said spool urging said rings into engagement with said seats and resiliently holding both said flow control means in lapped position,
a spring between said housing and said member urging said first flow control means toward open position with a predetermined biasing force,
both said valve rings and cooperating seats being arranged to close against the flow through said flow control means.

4. A deceleration responsive control means comprising a three-way valve and means responsive to deceleration for actuating said three-way valve to produce a modulated output pressure by controlling flow selectively from two sources of fluid at differing pressures, said control means including:
a housing,
a valve spool movably mounted in said housing and having aligned, resilient, substantially equal diameter valve rings,
said housing presenting an annular valve seat for engagement by one of said valve rings providing a first flow control means,
a member movably mounted in said housing connected to said valve spool and producing forces proportional to deceleration of said member, said member presenting an annular valve seat for engagement by the other of said valve rings providing a second flow control means,
a first spring between said member and said spool urging said rings into engagement with said seats and resiliently holding both said flow control means in lapped position,
a second spring between said housing and said member urging said first flow control means toward open position with a predetermined biasing force, both said valve rings and cooperating seats being arranged to close against the flow through said flow control means, and means connected to said inertia-mass defining an effective area exposed to the differential between said output pressure and one of said fluid pressures and operable to produce reactive forces opposing said deceleration and first spring forces, said reactive forces bping operable to close said first flow control means when said reactive forces minimally exceed said deceleration and first spring forces, without opening said second flow control means so that said output pressure is varied by said flow control means as a substantially linear function of deceleration, said first spring being effective to resist closing of said first flow control means until said output pressure is at a predetermined value.

5. A deceleration responsive control means comprising a body defining a low pressure chamber, a high pressure chamber and a modulated output pressure chamber;

first and second valve means movably and sealably supported in said body for controlling communication between said chambers, said valve means being operable i. to communicate said output and low pressure chambers while in a first position wherein said first valve means are closed and said second valve means are open, ii. to isolate each of said chambers while in a lapped position, wherein said first and second valve means are closed, iii. to communicate said output and high pressure chambers while in a second position, wherein said first valve means are open and said second valve means are closed;

a first means for resiliently holding siid first and second valve means in said lapped position with a predetermined force;

a second means for resiliently holding said first valve means in said open position;

an inertia-mass connected to said first and second valve means and producing forces proportional to deceleration of the mass which urge said second valve means toward said second position; and means connected to said inertia-mass defining an effective area exposed to the differential between said output and low pressures and operable to produce reactive forces proportional to said differential acting in opposition to deceleration forces produced by said mass, said reactive forces and said first resilient means opposing and balancing said deceleration forces and said second resilient means at lapped position of said valve means, so that said output pressure is varied by said valve means as a substantially linear function of deceleration.

6. A deceleration responsive control means comprising a housing having an output port and a pair of inlet ports, and a balanced valve including movable valve elements in said housing for controlling the pressure in said output port by selective communication with two sources of fluid at differing pressures connected to said inlet ports, one of said valve elements comprising an inertia member movable in response to deceleration forces acting on said inertia member and operably connected to move the other element to vary the pressure in said output port as a function of deceleration or acceleration forces, said housing including an independently movable diaphragm assembly adapted to act on said inertia member, a control chamber sealingly separated from the output pressure in the output port by said diaphragm assembly, a feedback passage for connecting a feedback pressure to the control chamber, the feedback pressure originating from an outside source connected to the output chamber, a one-way relief valve in the passage for trapping a higher feedback pressure in the control chamber upon sudden decrease in the feedback pressure, a restricted bypass orifice communicating the feedback passage and the control chamber, the feedback passage and bypass orifice permitting flow in either direction upon gradual change in the feedback pressure, the force produced by the differential between feedback and output pressure across said diaphragm assembly being effective to assist movement of the inertial member in the direction to actuate the valve to further decrease in output pressure, responsive to sudden decrease in deceleration, the trapping of the higher feedback pressure in the control chamber having a regenerative effect due to the action of the diaphragm assembly on the inertia member.

7. A control means as defined in claim 2 further including a shiftable plunger having a normal position operative to move the inertia member and valve spool to a position opening said first flow control means.

8. A control means according to claim 7 further including means for shifting said plunger from said normal position to allow said inertia member to operate responsive to deceleration forces in a given direction.

9. A deceleration responsive control means comprising a housing having an output port and a pair of inlet ports, and a balanced valve including movable valve elements in said housing for controlling the pressure in said output port by selective communication with two sources of fluid at differing pressures connected to said inlet ports, one of said valve elements comprising an inertia member movable in response to deceleration forces acting on said inertia member and operably connected to move the other element to vary the pressure in said output port as a function of deceleration or acceleration forces, and an On-Off assembly adapted to move said inertia member responsive to an external signal to a position wherein said valve communicates the higher pressure source with said output port, notwithstanding the action of deceleration forces in any direction on said inertia member.

10. A control means as defined in claim 9 in which said assembly includes first and second On-Off chambers, and movably mounted On-Off diaphragm assembly sealingly separating said chambers, said first and second On-Off chambers being adapted to be supplied with external pressures providing a differential pressure across the diaphragm assembly creating a force for moving said inertial member to a position wherein said valve communicates the higher pressure source with said output port, notwithstanding the action of deceleration forces in any direction on said inertia member.

11. In a skid controller for use with a power brake system on a wheeled vehicle having a manually operated means for controlling a power unit for varying the hydraulic pressure in the system to operate the brakes, a first means responsive to the deceleration of the vehicle for supplying a predetermined minimum positive fluid pressure differential gradient to the power unit whereby application and release of said manually operated means applies and releases the power unit during deceleration within the deceleration ability of the vehicle brake system, a second means for increasing the speed of response and duration of the release action of said first means responsive to a sudden lowering of the deceleration ability of the vehicle and brake system reflecting impending wheel slip toward lock-up, said second means supplying a negative fluid pressure differential to the power unit to reduce the power from said power unit applying the brakes of the vehicle at any level of brake application notwithstanding the continued application of said manually operated means.

* * * * *